United States Patent
Saudou et al.

(10) Patent No.: US 12,551,479 B2
(45) Date of Patent: Feb. 17, 2026

(54) ACYL-PROTEIN THIOESTERASE INHIBITOR FOR THE TREATMENT AND/OR PREVENTION OF HUNTINGTON'S DISEASE

(71) Applicants: UNIVERSITÉ GRENOBLE ALPES, Saint Martin d'Hères (FR); INSTITUT NATIONAL DE LA SANTE ET DE LA RECHERCHE MEDICALE, Paris (FR); CENTRE HOSPITALIER UNIVERSITAIRE GRENOBLE ALPES, La Tronche (FR); UNIVERSITÉ PARIS-SACLAY, Gif sur Yvette (FR)

(72) Inventors: Frederic Saudou, Grenoble (FR); Amandine Virlogeux, Craponne (FR)

(73) Assignees: UNIVERSITÉ GRENOBLE ALPES, Saint Martin d'Heres (FR); INSTITUT NATIONAL DE LA SANTE ET DE LA RECHERCHE MEDICALE, Paris (FR); CENTRE HOSPITALIER RÉGIONAL DE GRENOBLE, La Tronche (FR); UNIVERSITÉ PARIS-SACLAY, Gif-sur-Yvette (FR)

( * ) Notice: Subject to any disclaimer, the term of this patent is extended or adjusted under 35 U.S.C. 154(b) by 978 days.

(21) Appl. No.: 17/432,419

(22) PCT Filed: Feb. 21, 2020

(86) PCT No.: PCT/IB2020/051476
§ 371 (c)(1),
(2) Date: Aug. 19, 2021

(87) PCT Pub. No.: WO2020/170208
PCT Pub. Date: Aug. 27, 2020

(65) Prior Publication Data
US 2023/0181574 A1 Jun. 15, 2023

(30) Foreign Application Priority Data
Feb. 21, 2019 (FR) ........................................ 1901773

(51) Int. Cl.
*A61K 31/496* (2006.01)
*A61P 25/28* (2006.01)
(52) U.S. Cl.
CPC ............ *A61K 31/496* (2013.01); *A61P 25/28* (2018.01)
(58) Field of Classification Search
CPC .............................. A61K 31/496; A61P 25/28
See application file for complete search history.

(56) References Cited

U.S. PATENT DOCUMENTS

2018/0147250 A1* 5/2018 Dickinson ............ A61K 31/365

FOREIGN PATENT DOCUMENTS

WO 2014/191727 12/2014
WO WO-2014191727 A2 * 12/2014 ............. C07K 16/40

OTHER PUBLICATIONS

Adibekian (J.Am. Chem. Soc. vol. 10345-10348 published 2012). (Year: 2012).*
Dekker (Nature Chemical Biology vol. 6 pp. 449-456 published 2010). (Year: 2010).*
Rusch (Angew. Chem Int. Ed vol. 50 pp. 9838-9842 published 2011). (Year: 2011).*
Search Report and Written Opinion issued in French Patent Application No. 1901773 dated Feb. 21, 2019, with corresponding English translation of Written Opinion of the ISA for PCT/IB2020/051476 dated Jun. 12, 2020.
Adibekian et al., "Confirming Target Engagement for Reversible Inhibitors in Vivo by Kinetically Tuned Activity-Based Probes," Journal of the American Chemical Society, vol. 134, No. 25, Jun. 27, 2012, pp. 10345-10348.

(Continued)

*Primary Examiner* — George W Kosturko
(74) *Attorney, Agent, or Firm* — NIXON & VANDERHYE

(57) ABSTRACT

Disclosed is an inhibitor of the acyl-protein thioesterase APT1, ML-348, of formula A:

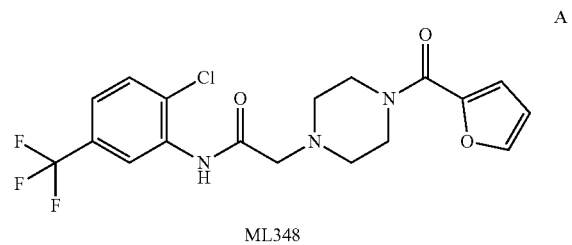

ML348 for use in the treatment and/or prevention of a disease or disorder in a subject in need thereof. In particular the inhibitor is for use in the treatment and/or prevention of a neurodegenerative disease or disorder, particularly Huntington's disease. Also disclosed is a pharmaceutical composition including at least the APT1 inhibitor and at least one pharmaceutically acceptable excipient. The inhibitor or composition is intended for use as a medicament. Furthermore, the inhibitor or composition is intended for use in the treatment and/or prevention of a disease or disorder related to impaired intracellular trafficking between the endoplasmic reticulum and the Golgi apparatus and between the latter and the plasma membrane.

7 Claims, 20 Drawing Sheets
Specification includes a Sequence Listing.

(56) References Cited

OTHER PUBLICATIONS

Boncompain et al., "Synchronization of Secretory Protein Traffic in Populations of Cells," Nature Methods, vol. 9, No. 5, May 2012, pp. 493-498.

Dorsey et al., "Natural History of Huntington's disease," JAMA Neurology, vol. 70, No. 12, Dec. 2013, pp. 1520-1530.

Gauthier et al., "Huntingtin Controls Neurotrophic Support and Survival of Neurons by Enhancing BDNF Vesicular Transport along Microtubules," Cell, vol. 118, Jul. 9, 2004, pp. 127-138.

Gencik et al., "Chorea Huntington: A Rare Case with Childhood Onset," Neuropediatrics, vol. 33, No. 2, 2002, pp. 90-92.

Gribaudo et al., "Propagation of α-Synuclein Strains within Human Reconstructed Neuronal Network," Stem Cell Reports, vol. 12, Feb. 12, 2019, pp. 230-244.

Hirano et al., "Thioesterase Activity and Subcellular Localization of Acylprotein Thioesterase 1/lysophospholipase 1," Biochimica et Biophysica Acta 1791—Molecular and Cell Biology of Lipids, 2009, pp. 797-805.

Lee et al., "Measures of growth in children at risk for Huntington disease," Neurology, vol. 79, Aug. 14, 2012, pp. 668-674.

Lin et al., "ABHD17 Proteins Are Novel Protein Depalmitoylases That Regulate N-Ras Palmitate Turnover and Subcellular Localization," Centre for Molecular Medicine & Therapeutics, Department of Medical Genetics, University of British Columbia, Vancouver, Canada, eLife, Dec. 23, 2015, pp. 1-14.

Nopoulos et al., "Smaller intracranial volume in prodromal Huntington's disease: evidence for abnormal neurodevelopment," Brain, vol. 134, 2011, pp. 137-142.

Paulsen, "Cognitive Impairment in Huntington's disease: Diagnosis and Treatment," Current Neurology and Neuroscience Reports, vol. 11, No. 5, Oct. 2011, pp. 474-483.

Papp et al., "Biological Markers of Cognition in Prodromal Huntington's Disease: A Review," Brain and Cognition, vol. 77, No. 2, 2011, pp. 280-291.

Rubinsztein et al., "Phenotypic Characterization of Individuals with 30-40 CAG Repeats in the Huntington's disease (HD) Gene Reveals HD Cases with 36 Repeats and Apparently Normal Elderly Individuals with 36-39 Repeats," American Journal of Human Genetics, vol. 59, No. 1, 1996, pp. 16-22.

Tereshchenko et al., "Abnormal development of cerebellar-striatal circuitry in Huntington disease," American Neurology, vol. 94, No. 18, May 5, 2020, pp. 1-8.

Tomatis et al., "Acyl-Protein Thioesterase 2 Catalizes the Deacylation of Peripheral Membrane-Associated GAP-43," PLOS ONE, vol. 5, No. 11, Nov. 2010, e15045, pp. 1-15.

Vujic et al., "Acyl protein thioesterase 1 and 2 (APT-1, APT-2) inhibitors palmostatin B, ML348 and ML349 have different effects on NRAS mutant melanoma cells," Oncotarget, vol. 7, No. 6, Feb. 9, 2016, pp. 7297-7306.

Yanai et al., "Palmitoylation of Huntingtin by HIP14 Is Essential for Its Trafficking and Function," Nature Neuroscience vol. 9, No. 6, Nature Publishing Group, 2006, pp. 824-831.

Young et al., "Putting Proteins in Their Place: Palmitoylation in Huntington's disease and Other Neuropsychiatric Diseases," Progress in Neurobiology, Elsevier, vol. 97, No. 2, 2011, pp. 220-238.

Young et al., "Low Levels of Human HIP14 Are Sufficient to Rescue Neuropathological, Behavioural, and Enzymatic Defects Due to Loss of Murine HIP14 in Hip14-/-Mice," PLoS ONE, vol. 7, No. 5, May 2012, e36315, pp. 1-12.

Zeidman et al., "Protein acyl thioesterases (Review)," Molecular Membrane Biology, vol. 26, No. (1-2), 2009, pp. 32-41.

Igor Vujic, et al., "Acyl protein thioesterase 1and2 (APT-1, APT-2) inhibitors 1-8 palmostatin B, ML348 and ML349 have different effects on NRAS mutant melanoma cells" Oncotarget, vol. 7, No. 6, Feb. 9, 2016. [submission pending].

Anat Yanai, et al., "Palmitoylation of huntingtin by HIP14is essential for its trafficking 1-8 and function", Nature Neuroscience, US., vol. 9, No. 6, May 14, 2006, pp. 824-831. [submission pending].

International Search Report for PCT/IB2020/051476 dated Jun. 12, 2020, 8 pages.

Written Opinion of the ISA for PCT/IB2020/051476 dated Jun. 12, 2020, 6 pages.

Won et al., "Protein depalmitoylases", Crit Rev Biochem Mol Biol., Feb. 2018, vol. 53(1), pp. 83-98.

Hernandez et al., "APT2 Inhibition Restores Scribble Localization andS-Palmitoylation in Snail-Transformed Cells", Cell Chemical Biology, vol. 24, Jan. 19, 2017, pp. 87-97.

Savinainen et al., "Biochemical and Pharmacological Characterization of the Human Lymphocyte Antigen B-Associated Transcript 5 (BAT5/ABHD16A)", PLOS ONE, vol. 9, Issue 10, Oct. 2014, e109869, pp. 1-17.

Tortosa et al., "Dynamic Palmitoylation Targets MAP6 to the Axon toPromote Microtubule Stabilization during Neuronal Polarization", Neuron, vol. 94, May 17, 2017, pp. 809-825.

Tse Shen Lin et al., "ABHD17 proteins are novel protein depalmitoylases that regulate N-Ras palmitate turnover and subcellular localization", eLife, 2015, 4:e11306, pp. 1-14.

* cited by examiner

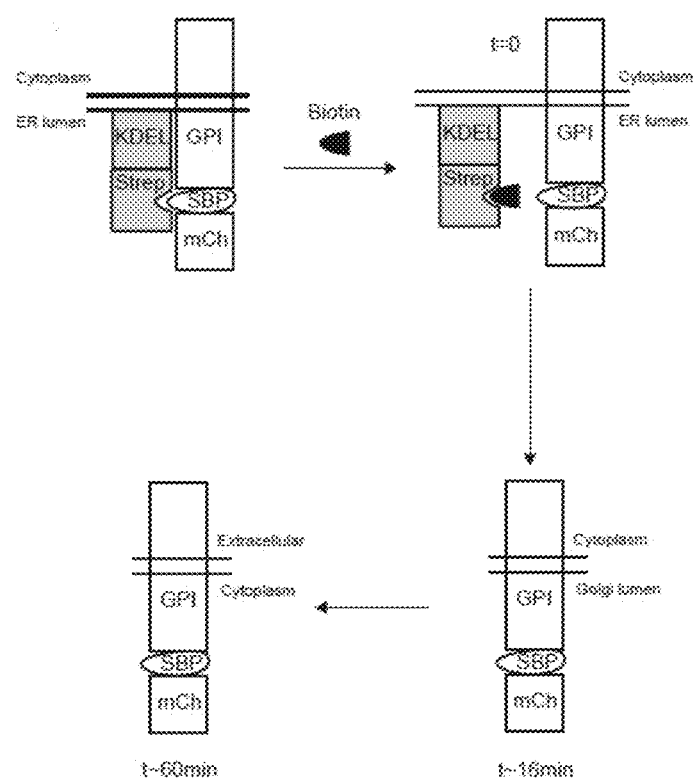

[Fig. 1B]
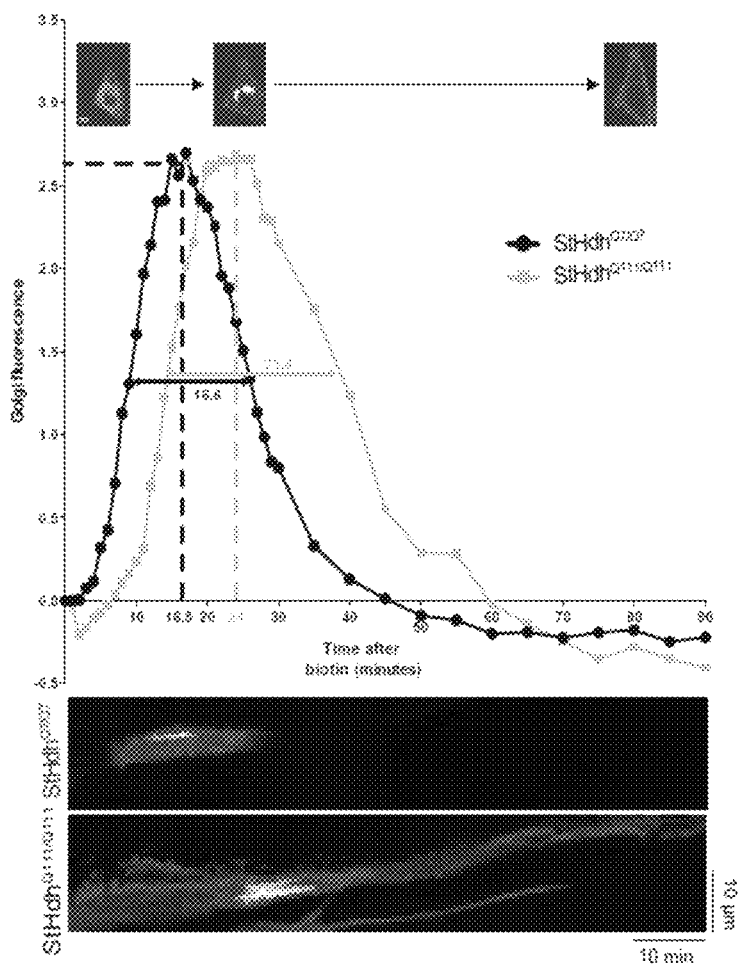
[Fig. 1C]
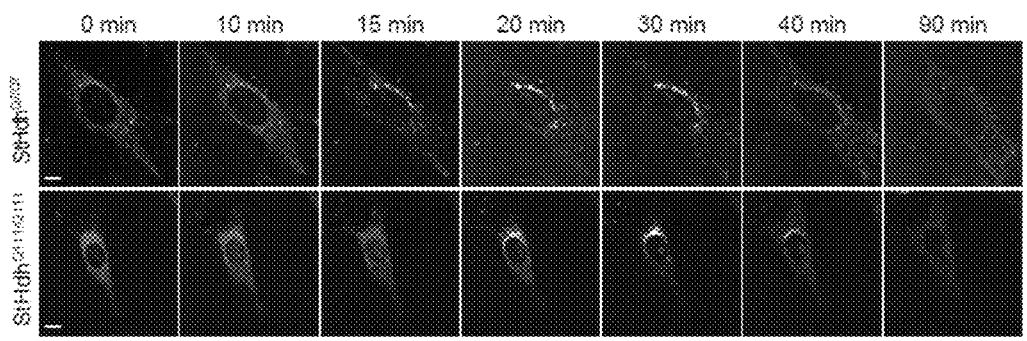

[Fig. 2A]
[Fig. 2B]
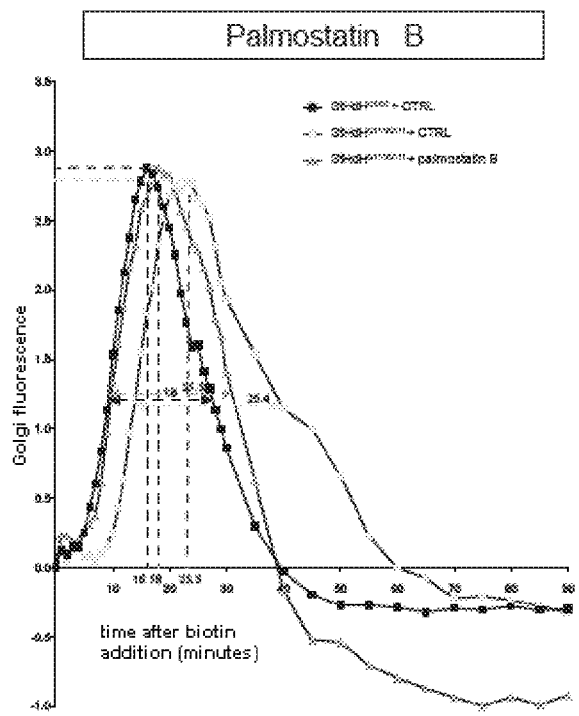

[Fig. 2C]
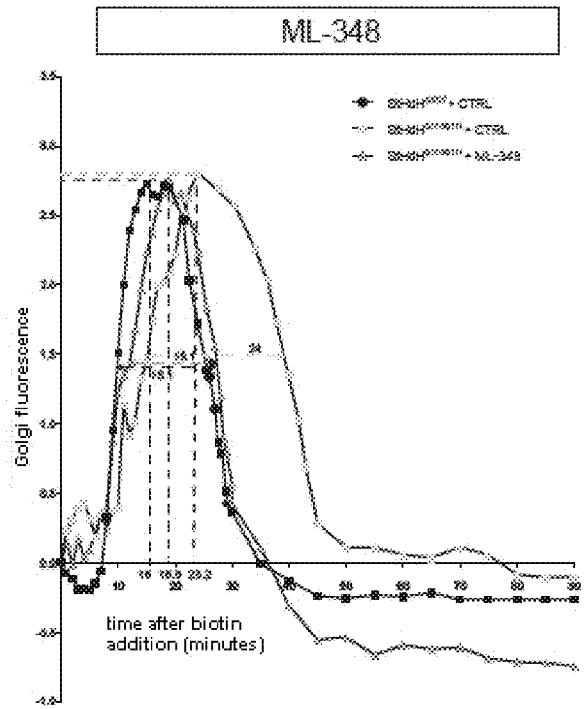
[Fig. 2D]
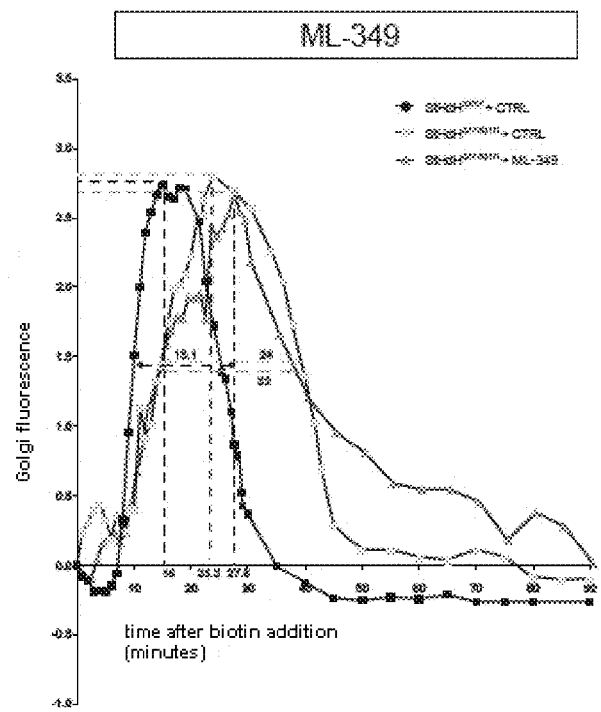

[Fig. 2E]
[Fig. 2F]
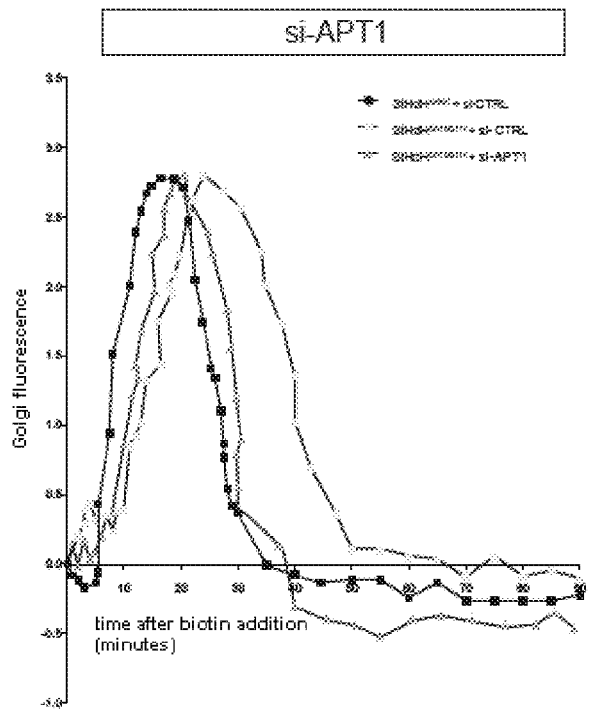

[Fig. 2G]
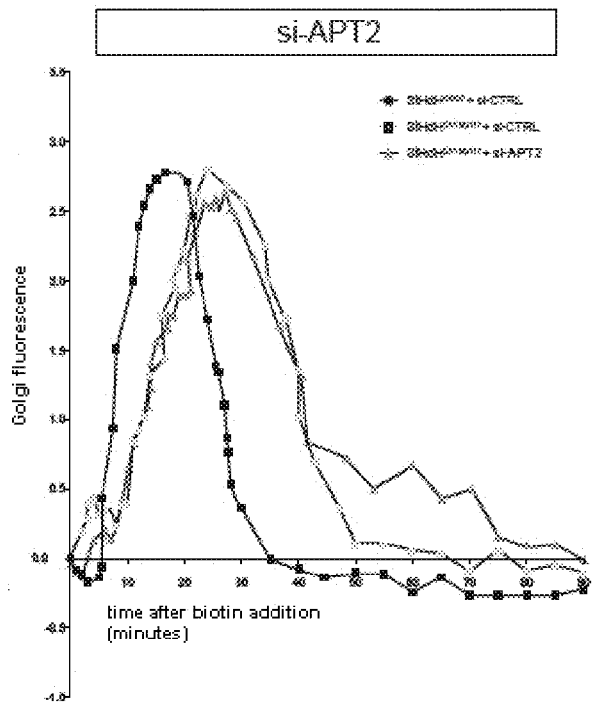
[Fig. 3A]
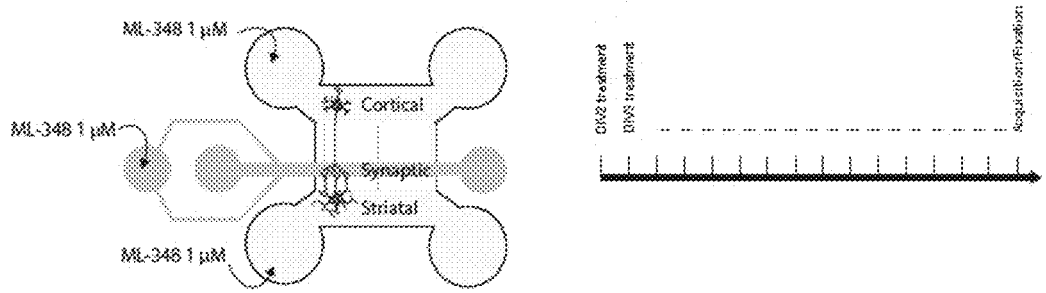
[Fig. 3B]
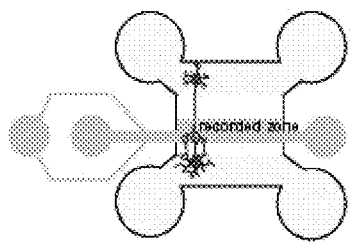

[Fig. 3C]
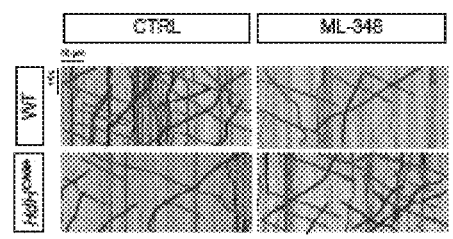
[Fig. 3D]
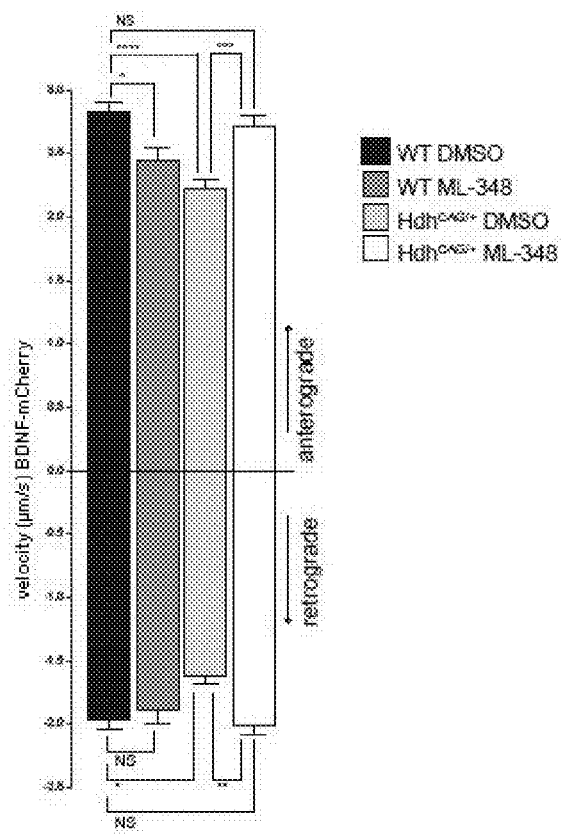

[Fig. 3E]
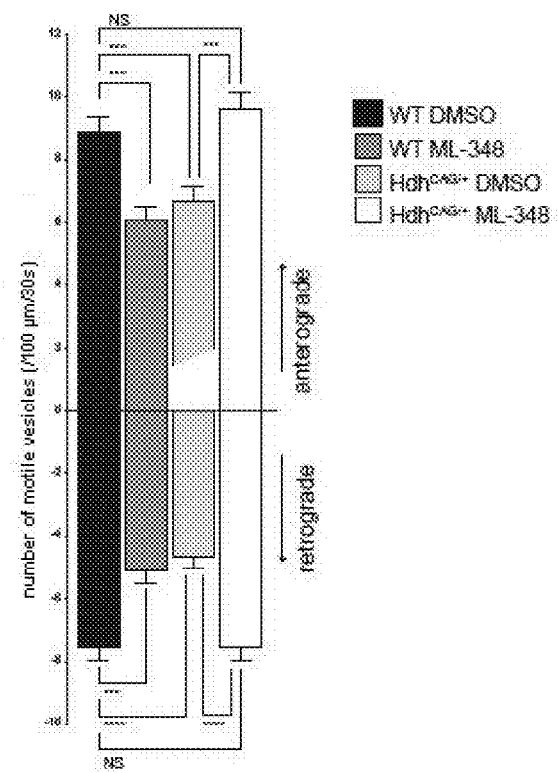
[Fig. 3F]
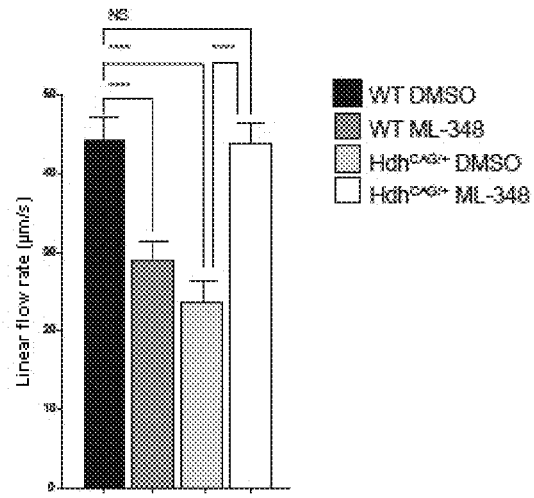

[Fig. 3G]
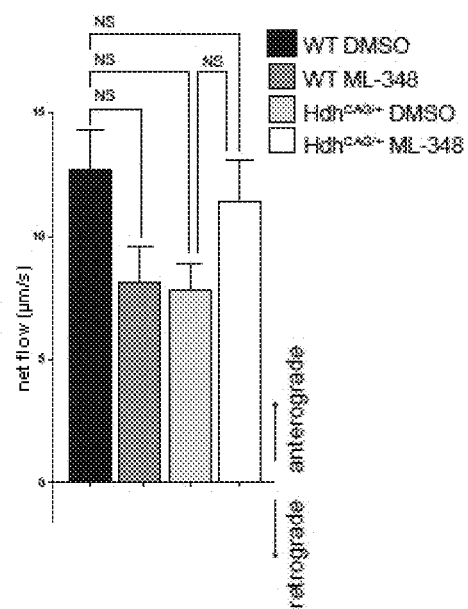
[Fig. 3H]
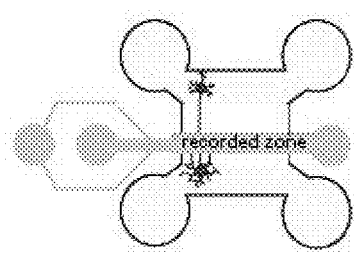

[Fig. 3I]
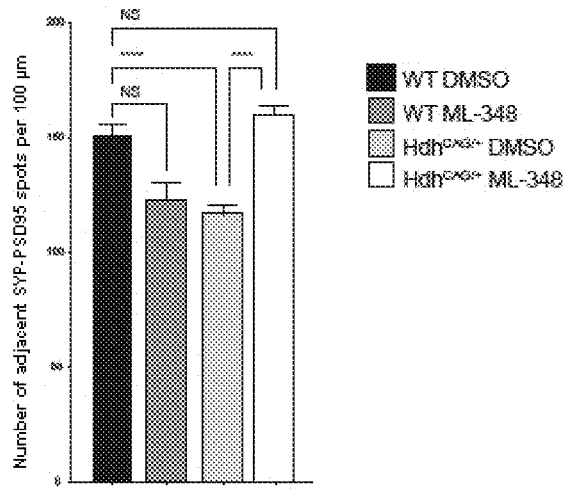
[Fig. 3J]
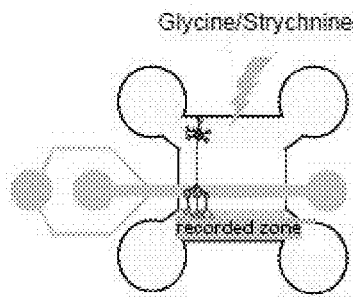
[Fig. 3K]
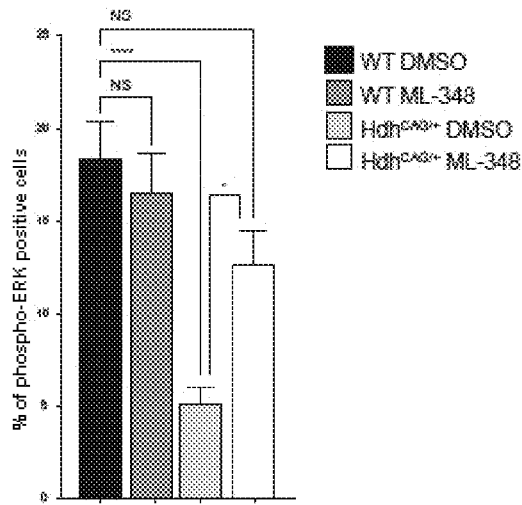

[Fig. 3L]
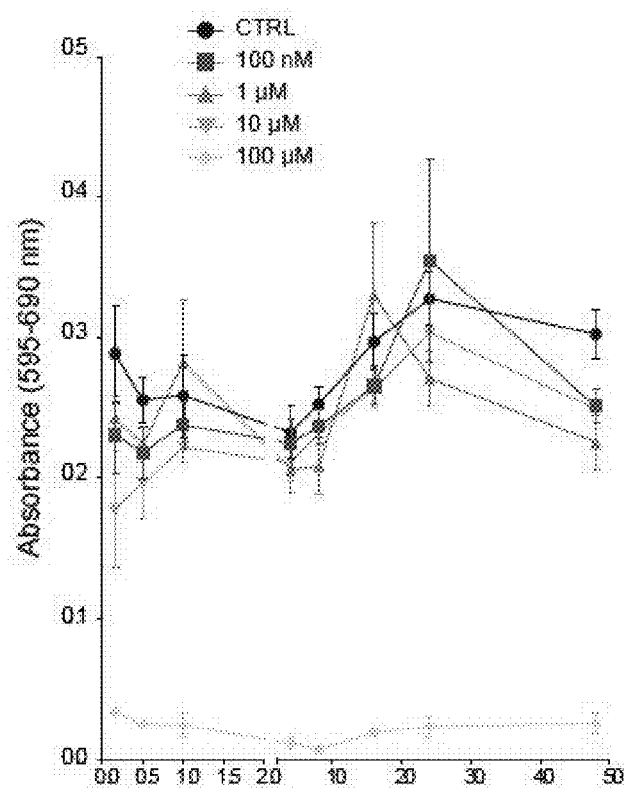
[Fig. 3M]
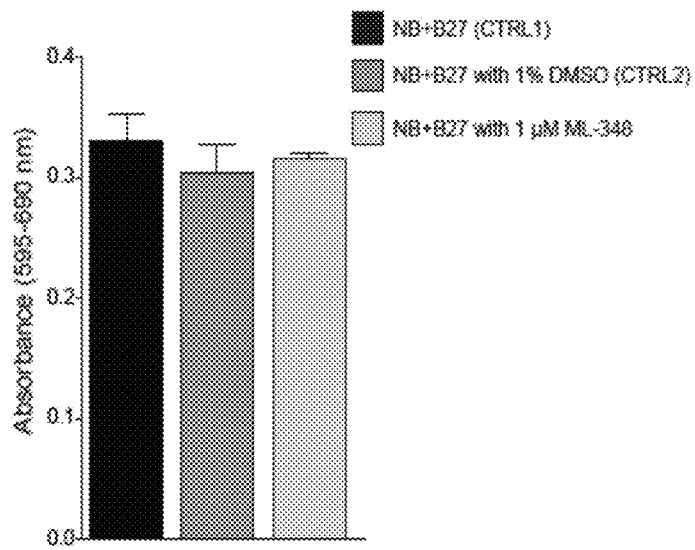

[Fig. 4A]
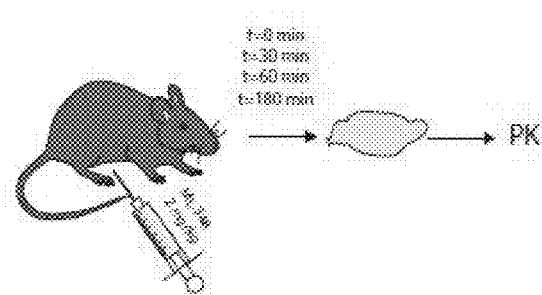
[Fig. 4B]
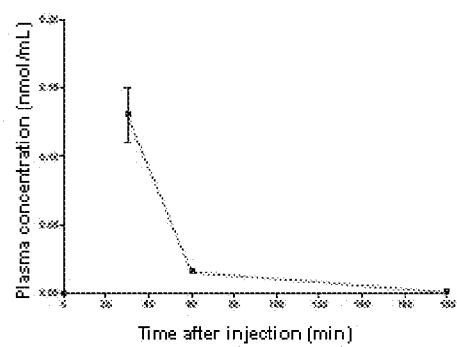
[Fig. 4C]
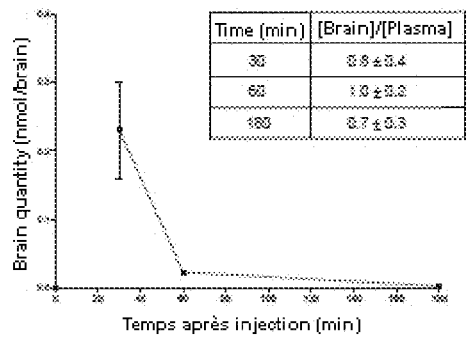

[Fig. 4D]
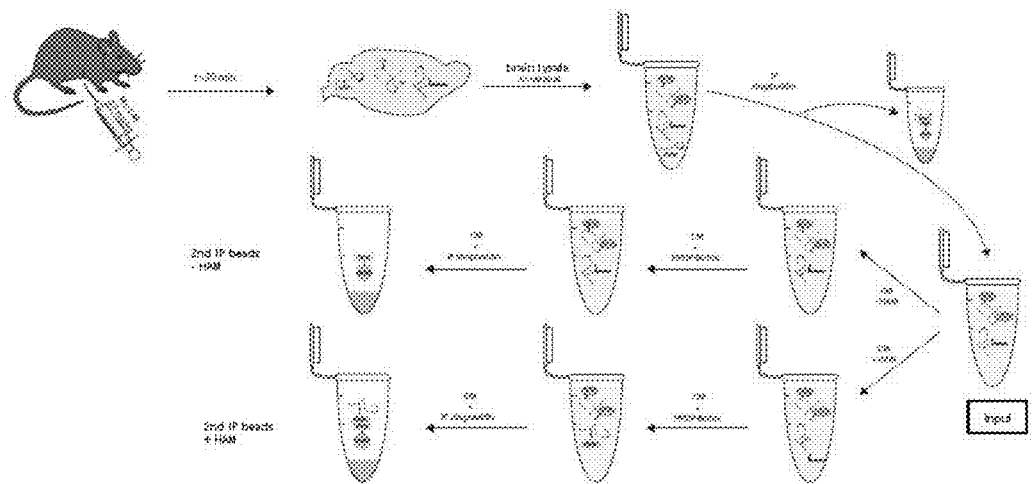
[Fig. 4E]
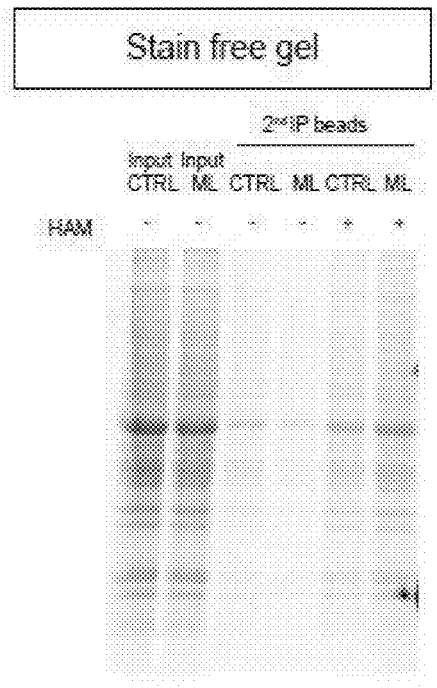

[Fig. 4F]
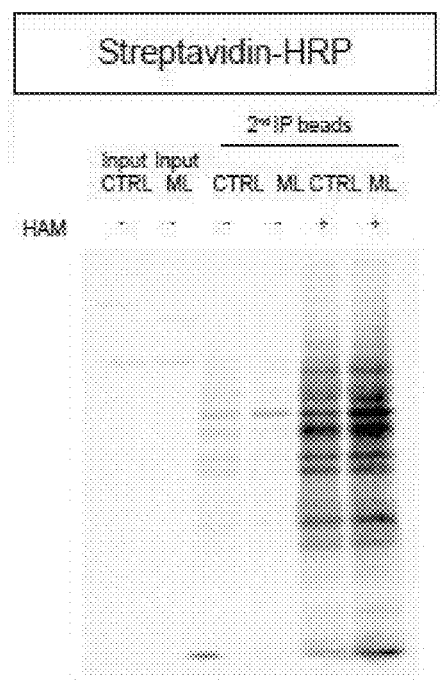
[Fig. 4G]
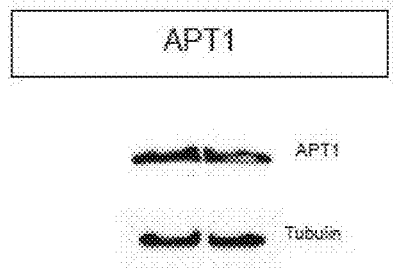

[Fig. 5A]
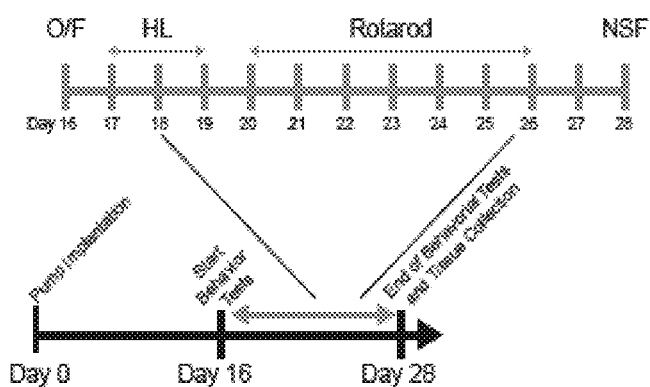
[Fig. 5B]
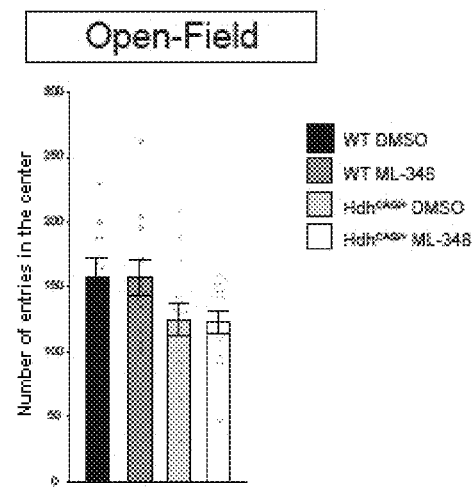

[Fig. 5C]
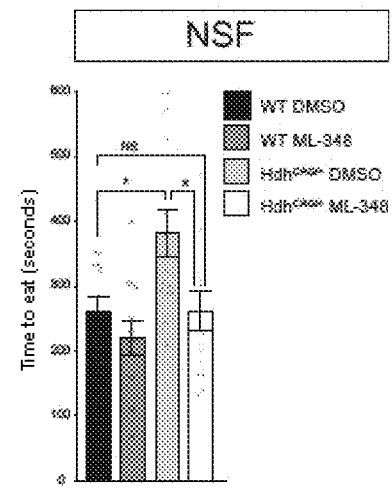
[Fig. 5D]
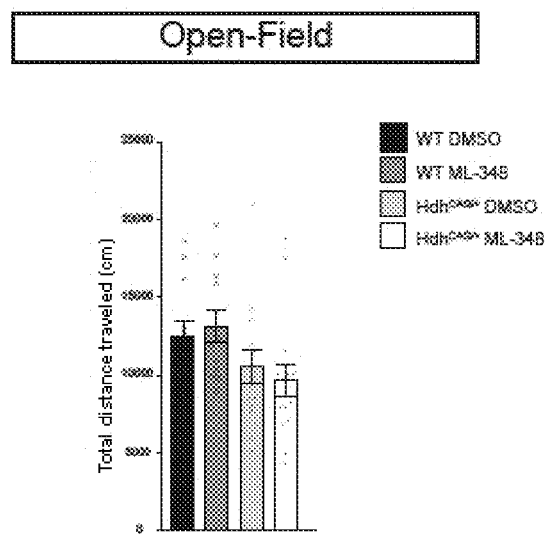

[Fig. 5E]
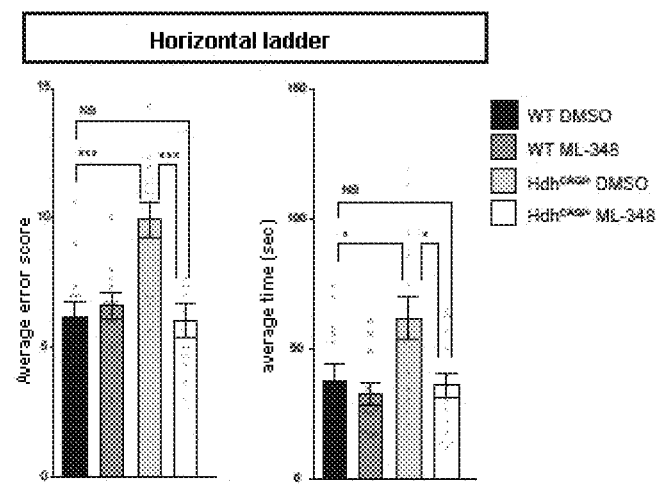

[Fig. 5F]
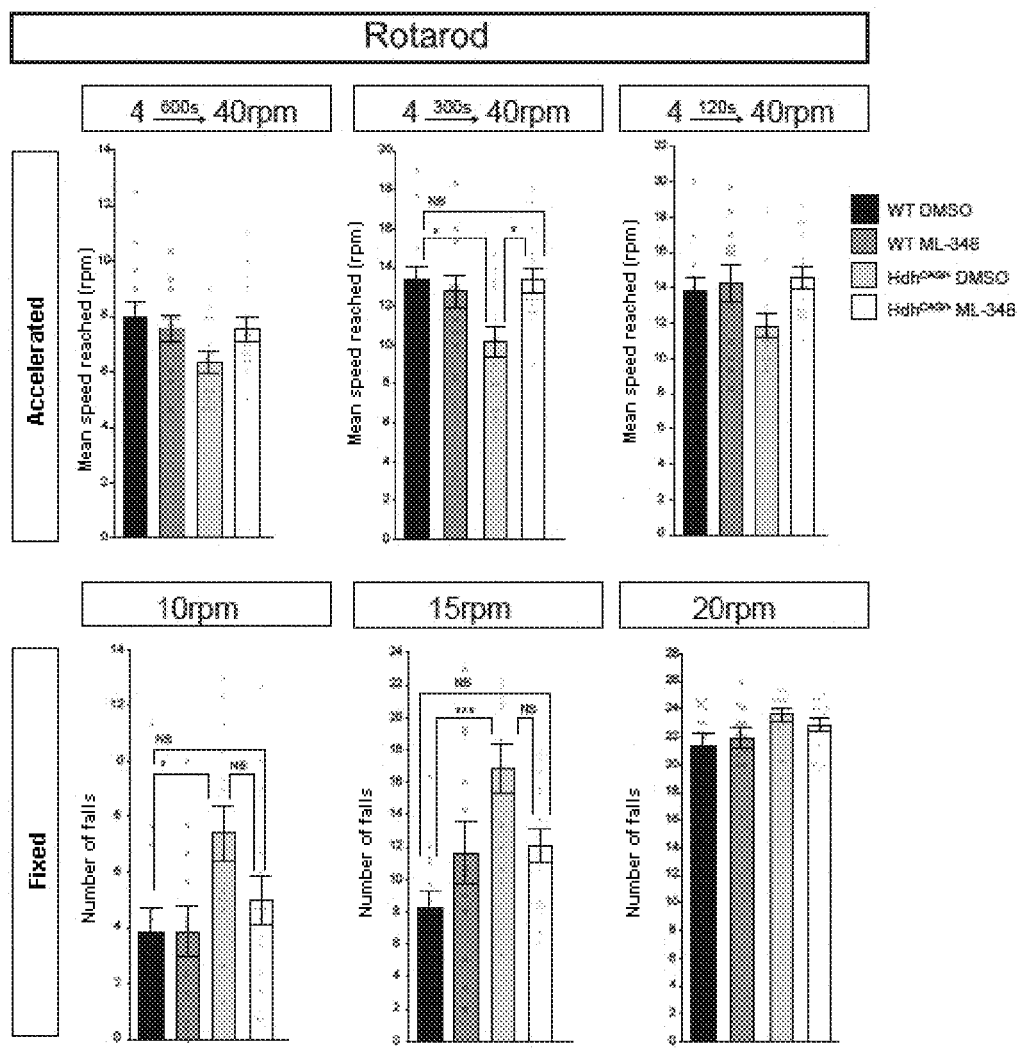

[Fig. 6A]
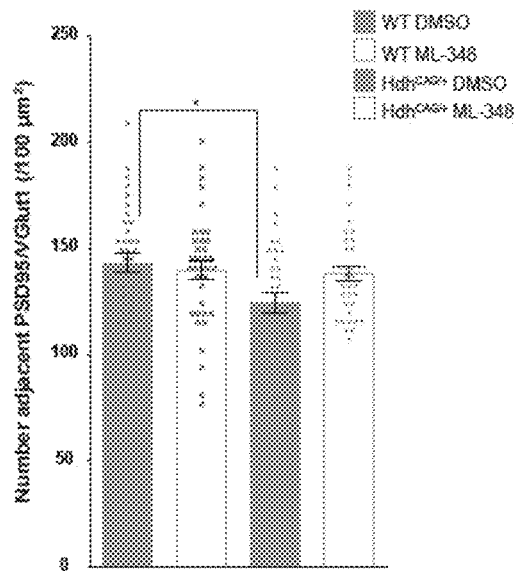
[Fig. 6B]
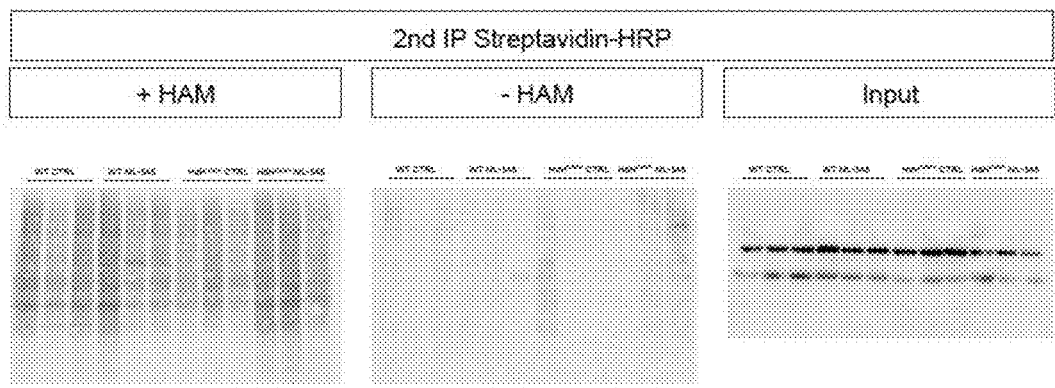
[Fig. 7A]
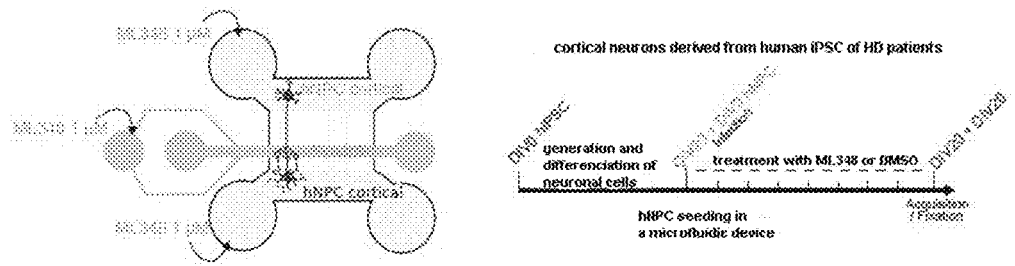

[Fig. 7B]
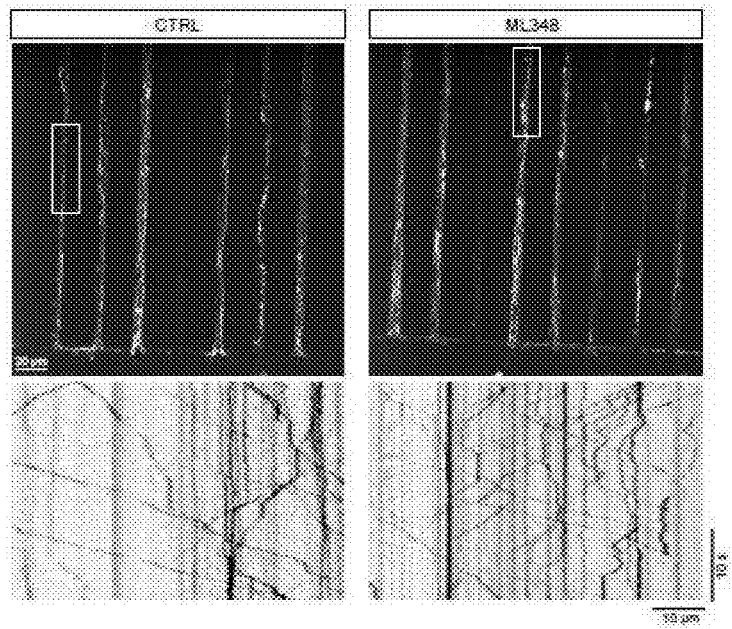
[Fig. 7C]
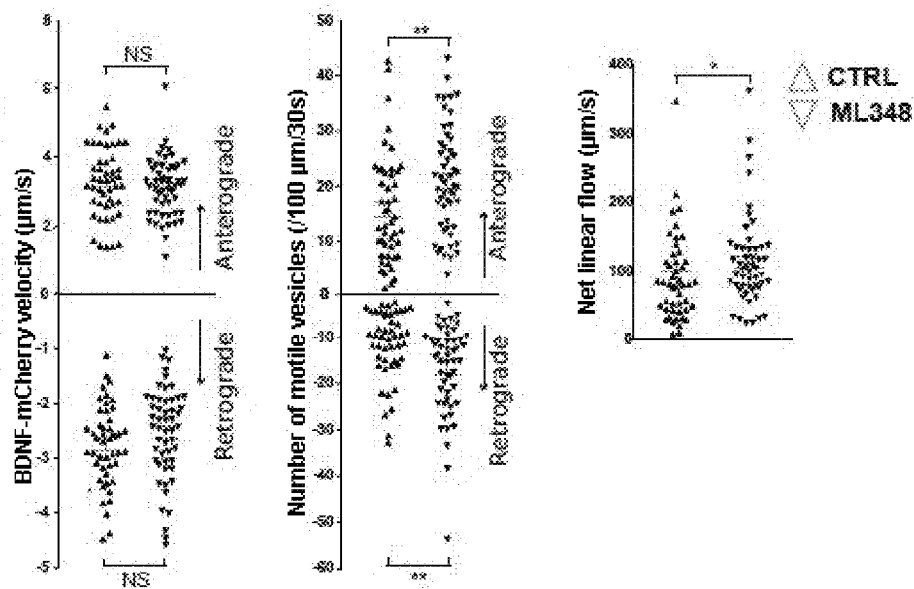

ACYL-PROTEIN THIOESTERASE INHIBITOR FOR THE TREATMENT AND/OR PREVENTION OF HUNTINGTON'S DISEASE

This application is the U.S. national phase of International Application No. PCT/IB2020/051476 filed Feb. 21, 2020 which designated the U.S. and claims priority to FR Patent Application No. 1901773 filed Feb. 21, 2019, the entire contents of each of which are hereby incorporated by reference.

BACKGROUND OF THE INVENTION

Field of the Invention

The present invention relates to the field of treatment and prevention of neurodegenerative diseases, and in particular relates to the treatment and prevention of Huntington's disease.

Description of the Related Art

Neurodegenerative diseases or neurodegenerative disorders include a wide range of conditions that primarily affect neurons. Examples of neurodegenerative diseases and disorders that are related to defects in protein addressing and intracellular trafficking include, but are not limited to, Huntington's disease, Parkinson's disease, Amyotrophic Lateral Sclerosis or Charcot disease (ALS), Rett's syndrome, Charcot-Marie-Tooth disease, motor-sensory axonal neuropathy, Perry's syndrome, early-onset autosomal dominant Alzheimer's disease (AD3), progressive supranuclear palsy syndrome (PSP), autosomal spastic paraplegia.

Huntington's disease is an inherited neurological disease of genetic origin characterized by psychiatric, motor and cognitive deficits appearing around 30-40 years of age in humans, and by a neuron dysfunction and degeneration in the cortex and striatum. Huntington's disease affects about 6000 people in France, and more than 12000 people carry the mutant gene, temporarily without clinical signs. It is a rare disease with a stable prevalence of 10 to 14 patients per 100,000 within the Caucasian population. There is currently no neuroprotective treatment allowing to slow down the onset or progression of the disease. In particular, no non-symptomatic drug therapy is commercially available. Therapies currently in development focus particularly on antisense or microRNA strategies as translational regulators.

Huntington's disease has an autosomal dominant transmission and has a complete penetrance. It is assumed that the carrier of the mutant gene will develop the disease during his lifetime. The HD gene is located in humans on chromosome 4p16.3. It is composed of 67 exons and covers 170 kb. It encodes the huntingtin protein (HTT), which has a critical function in the regulation of intracellular dynamics, particularly in axonal transport. It regulates the vesicle trafficking, in particular of BDNF (Brain Derived Neurotrophic Factor), an essential neurotrophic factor.

The mutant gene contains an unstable trinucleotide CAG (cytosine, adenine, guanine) repeat which encodes a polyglutamine stretch (polyQ) in the huntingtin (HTT) protein. When the number of glutamines encoded by the gene exceeds 35 repeats, it triggers neuronal dysfunction and death, affecting in particular the cortex and the striatum. People carrying 39 to 60 repeats are certain to develop Huntington's disease, in which case penetrance is said to be complete; reduced penetrance is observed in the presence of 36 to 39 repeats (Rubinsztein et al., 1996). Stretches of more than 60 repeats are usually associated with juvenile and adolescent forms of Huntington's disease (Gencik et al., 2002). It is recognized that in Huntington's disease, polyQ stretch leads to a gain of new toxic functions, but also to a loss of the neuroprotective functions of wild-type HTT. Even before the first symptoms appear, dysfunctions exist within the corticostriatal neural network.

When the huntingtin protein is mutant, BDNF transport from the cortex to the striatum is reduced, leading to the dysfunction and death of neurons in the striatum and cortex (Gauthier et al., 2004). One of the therapeutic strategies is to restore this transport in order to compensate for the deficit in neurotrophic supply and to slow down the progression of the symptoms of Huntington's disease.

Huntington's disease is generally characterized by a triad of symptoms: motor, cognitive and psychiatric. Motor disorders are generally divided in two phases: the first, the hyperkinetic phase, appears during the early stages of the disease and is characterized by prominent chorea (Dorsey et al, 2013), the second, the hypokinetic phase, appears later and is characterized by bradykinesia, dystonia, balance and gait disorders. Cognitive disorders occur several years before the onset of motor symptoms. A range of cognitive deficits are observed in many areas such as psychomotor speed, executive function, attention, episodic and working memory, learning, emotion, and odor (Paulsen, 2011; Papp et al., 2011). Finally, a wide variety of neuropsychiatric symptoms occur in Huntington's disease, namely anxiety, irritability, apathy, obsessive-compulsive behaviors and psychosis.

The link between palmitoylation and Huntington's disease is currently known, as summarized in the review by Fiona B. Young et al. 2011. Palmitoylation is an important modification for protein addressing and trafficking within neurons. It corresponds to the addition of a fatty acid, palmitate, onto a cysteine residue. Unlike other acylations such as myristoylation and isoprenylation, palmitoylation is reversible. Palmitoylation increases the hydrophobicity of proteins and therefore promotes interactions with the lipid bilayer. Consequently, it modifies protein addressing.

Palmitoylation is catalyzed by a family of proteins, the palmitoyl acyltransferases (PATs). The genes encoding these proteins are highly conserved among species. One of them, HIP14, palmitoylates various proteins involved in synaptic plasticity, exocytosis and development.

Unlike PATs, the discovery of enzymes that catalyze depalmitoylation has been much slower. To date, six enzymes responsible for depalmitoylation have been identified: PPT1 (palmitoyl-protein thioesterase), PPT2, APT1, APT2, APTL1, and the ABHD17 proteins (Tse et al., 2015; Tomatis et al., 2010 and Zeidman et al., 2009). APT1 and APT2 are cytosolic proteins with common substrates. APT1 is expressed in numerous tissues in mice (Hirano et al., 2009). It has particularly a role in memory.

Studies suggest that palmitoylation is impaired when huntingtin (HTT) is mutant and that re-expression of an enzyme promoting palmitoylation named HIP14 could inhibit cell death. However, overexpression of HIP14 has toxic effects and there are no molecules stimulating this enzyme. Overexpression of HIP14 in cortical neurons increases palmitoylation of HTT and relocates HTT to the Golgi apparatus, suggesting that the localization of HTT to the Golgi is depending on its palmitoylation (Yanal et al., 2006).

The present inventors have used a reverse strategy consisting in inhibiting the enzymes responsible for depalmitoylation, the acyl-protein thioesterases, for which selective molecules exist. So far, the published studies relate to the restoration of HIP14 activity in the treatment of Huntington's disease without describing the depalmitoylation process as a new therapeutic axis.

As indicated above, the link between palmitoylation and Huntington's disease is well known (Yanal et al., 2006), as are the enzymes involved in this process: HIP14 and HIP14L for protein palmitoylation, including palmitoylation of the huntingtin protein HTT. The enzymes regulating the reverse reaction, depalmitoylation, are thioesterases, including APT1 and APT2 (Young et al., 2012). In addition, other publications describe thioesterase inhibitor molecules including ML-348 (Adibekian et al., 2012 and Vujic et al., 2015).

While thioesterase inhibitor molecules and in particular ML-348 are known, especially from the publication of Adibekian et al., 2012, the therapeutic potential of the latter is not mentioned. Furthermore, it appears from the studies of Vujic et al., 2015, that the inhibitors ML-348 (specific for APT1) and ML-349 (specific for APT2) have no biologically significant effect on melanoma cells, as opposed to Palmostatin B. These studies stay silent on the potential for therapeutic research on neurodegenerative diseases, particularly Huntington's disease.

There is currently no molecule allowing the restoration of intracellular trafficking that is altered in a neurodegenerative disease such as Huntington's disease. The object of the present invention is to highlight the important role of the acyl-protein thioesterase APT1 inhibitor, ML-348, in the treatment and the prevention of Huntington's disease. Its effects on both cognitive and motor deficits demonstrate the new therapeutic and prophylactic potential of this compound in Huntington's disease. This inhibitor is of major interest because there is currently no neuroprotective drug therapy available for Huntington's disease.

SUMMARY OF THE INVENTION

In order to screen for molecules related to global intracellular dynamics in neurons, the inventors adapted a system called RUSH (Retention Using Selective Hooks) which allows to track vesicular trafficking from the endoplasmic reticulum (ER) to the plasma membrane (Boncompain et al., 2012), both in wild type and Huntington's disease mutant cells. They observed that palmostatin B, a non-specific inhibitor of acyl-protein thiolesterases was able to restore intracellular trafficking in a manner comparable to wild-type cells. They then tested other selective inhibitor molecules for different acyl-protein thioesterases (APT1 and APT2) present in neurons.

Thus, they were able to demonstrate that only the APT1-specific molecule ML-348 was effective. Thanks to the in vitro microfluidic approach which consists in manufacturing, in a biocompatible and transparent material, culture chambers and channels at the cellular scale, they reconstituted the normal and dysfunctional corticostriatal circuit in Huntington's disease. This system being compatible with rapid high-resolution microscopy, it allows to study intracellular trafficking mechanisms in a mature and functional neuronal network.

The results detailed below show that:
inhibition of APT1 by ML-348 restores BDNF transport from the cortex to the striatum, suggesting that ML-348 is a molecule of therapeutic interest for Huntington's disease;
ML-348 crosses the blood brain barrier: in 5-month-old $Htt^{CAG140/+}$ mice models of Huntington's disease,
treated with the ML-348 inhibitor, it has been shown that this treatment restores the behavioral alterations linked to the disease, both in terms of motor skills and anxiety.

The inventors, after identifying the inhibitor ML-348 as a molecule restoring the kinetics of the secretory pathway, evaluated its effect on the corticostriatal network in vitro. ML-348 is able to ameliorate the deficits in BDNF axonal transport, the defects in synaptic density and striatal signaling in Huntington's disease. Treatment of healthy neurons does not show defects in the corticostriatal network, except for the number of BDNF vesicles transported along the axon. The potential multiplicity of APT1 substrates does not allow to conclude that the restoration of network function on the microfluidic chip is due solely to the restoration of transport kinetics in the secretory pathways. However, given the role of axonal transport and cortical afferents in network functioning, it appears that restoration of traffic is essential to the restoration mechanism.

The present invention therefore relates to an inhibitor of the acyl-protein thioesterase APT1, ML-348, of formula A:

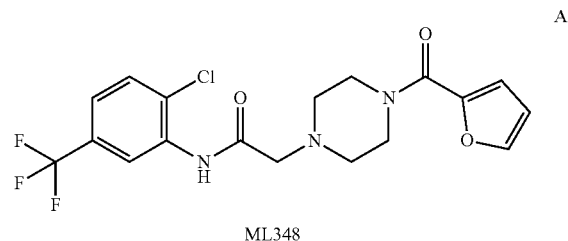 [SMILES: O=C(CN1CCN(C(=O)c2ccco2)CC1)Nc1cc(C(F)(F)F)ccc1Cl]

ML348 for use in the treatment and/or prevention of a disease or disorder in a subject in need thereof.

According to a particular embodiment, the inhibitor may be for use in the treatment and/or prevention of a neurodegenerative disease or disorder.

Such neurodegenerative diseases or disorders include, but are not limited to, Huntington's disease, Parkinson's disease, Amyotrophic Lateral Sclerosis or Charcot's disease (ALS), Rett's syndrome, Charcot-Marie-Tooth disease, motor-sensory axonal neuropathy, Perry's syndrome, early-onset autosomal dominant Alzheimer's disease (AD3), progressive supranuclear palsy syndrome (PSP), autosomal spastic paraplegia.

Preferably, the neurodegenerative disease or disorder is Huntington's disease.

The neurodegenerative disease or disorder can also be Rett's syndrome. Indeed, this genetic disease is linked to the mutation of a gene carried by the X chromosome, the MECP2 gene. The protein encoded by this gene has an important function in the development and harmonious functioning of neurons and among the altered physiological pathways is that of BDNF. As mentioned above, Huntingtin plays a critical role in regulating the trafficking of this essential neurotrophic factor.

Further, the acyl-protein thioesterase inhibitor APT1 of the present invention is capable of binding to acyl-protein thioesterase APT1.

Thus, the binding of ML-348 allows to prevent the substrate from binding to the active site of the acyl-protein thioesterase APT1 enzyme and/or the APT1 enzyme from catalyzing its depalmitoylation reaction.

The invention also relates to a pharmaceutical composition comprising:

at least the APT1 acyl-protein thioesterase inhibitor of the present invention; and at least one pharmaceutically acceptable excipient.

The term "pharmaceutically acceptable excipient" refers to a non-toxic material that is compatible with a biological system such as a cell, cell culture, tissue or organism. This pharmaceutically acceptable excipient does not produce an adverse, allergic or other reaction when administered to an animal, particularly a human. The characteristics of the excipient will depend on the mode of administration used.

This includes any solvent, diluent, dispersion medium, agglutinator, binder, lubricant, disintegrant, coating, antibacterial and antifungal agent, isotonic agent and absorption retardant, and similar adjuvants. A pharmaceutically acceptable excipient refers to a non-toxic solid, semi-solid or liquid filler, diluent, encapsulating material or accessory formulation of any type. For human administration, the preparations must meet the requirements of sterility, pyrogenicity, general safety and purity as required by the Good Manufacturing Practices for active substances for human and veterinary use.

According to the invention, the APT1 acyl-protein thioesterase inhibitor or composition is intended to be administered to the subject in a therapeutically effective amount.

The term "therapeutically effective amount" means the rate or amount of compound necessary and sufficient to slow down or stop the progression, worsening or deterioration of one or more symptoms of the disease or disorder, in particular the neurodegenerative disease or disorder, more particularly Huntington's disease; alleviate the symptoms of the disease or disorder, in particular the neurodegenerative disease or disorder, more particularly Huntington's disease.

The "therapeutically effective amount" depends on the subject, the stage of the disease to be treated and the mode of administration, and can be determined by routine operations by the person skilled in the art.

A "therapeutically effective amount" is an amount sufficient to reduce the symptoms of the disease and its progression. This quantity may vary with the age, the sex of the subject and the stage of the disease and will be determined by the person skilled in the art.

Advantageously, a therapeutically effective amount can vary between 0.01 and 100 mg/kg body weight, preferably between 0.1 and 20 mg/kg, and more preferably between 0.1 and 2 mg/kg, in one or more daily administrations, for one or more days.

Furthermore, the specific therapeutically effective dose for any patient will depend on a variety of factors including the disorder being treated and the severity of the disorder; the potency of the specific compound used; the specific composition used, the age, body mass, general health, gender and diet of the patient; the duration of administration, the route of administration, and the rate of excretion of the specific compound used; the duration of treatment; the drugs used in combination or simultaneously with the specific compound used; and similar factors well known in the medical art. For example, it is well within the skill of the skilled person to start doses of the compound at rates lower than those required to achieve the desired therapeutic effect and gradually increase the dosage until the desired effect is achieved. However, the daily dosage of the products can be varied over a wide range from about 10 to about 10000 mg per adult per day, preferably from about 100 to about 5000, more preferably from about 200 to about 2000 mg per adult per day. Preferably, the compositions contain 10, 50, 100, 250, 500, 1000 and 2000 mg of the active ingredient for symptomatic adjustment of the dosage to the patient to be treated. A medicament typically contains from about 10 to about 10000 mg of the active ingredient, preferably 100 to about 5000, more preferably from about 200 to about 2000 mg of the active ingredient. An effective amount of the drug is typically provided at a dosage ranging from 0.1 mg/kg to about 100 mg/kg body weight per day, preferably from about 1 mg/kg to 40 mg/kg body weight per day, more preferably from about 2 mg/kg to 20 mg/kg body weight per day.

In the pharmaceutical compositions of the present invention, the active ingredient, alone or in combination with another active ingredient, can be administered in a unitary form of administration, as a mixture with conventional pharmaceutical carriers, to animals and humans. Suitable unit dosage forms include oral forms such as tablets, capsules, powders, granules and oral suspensions or solutions, sublingual and buccal forms of administration, aerosols, implants, subcutaneous, transdermal, topical, intraperitoneal, intramuscular, intravenous, subdermal, transdermal, intrathecal and intranasal forms of administration and rectal forms of administration.

In a particular embodiment of the invention, the inhibitor or the composition is for use as a medicament.

To this end, the pharmaceutical composition or medicament contains vehicles that are pharmaceutically acceptable for a formulation adapted for oral administration.

Examples of forms adapted for oral administration include, but are not limited to, tablets, orodispersion tablets, effervescent tablets, powders, granules, pills (including sweetened pills), dragees, capsules (including soft gelatin capsules), syrups, liquids, gels or other solutions, suspensions, slurries, liposomal forms and the like.

In one embodiment, the pharmaceutical composition or the drug contains vehicles that are pharmaceutically acceptable for an injectable formulation.

Examples of forms suitable for injection include, but are not limited to, solutions, such as, for example, sterile aqueous solutions, dispersions, emulsions, suspensions, solid forms suitable for use in preparing solutions or suspensions by the addition of a liquid prior to use, e.g., a powder, liposomal forms or the like.

The mode of administration may be by injection or by gradual infusion. Injection may be intravenous, intraperitoneal, intramuscular, subcutaneous or transdermal.

Preparations for parenteral administration may include aqueous or non-aqueous sterile solutions, suspensions or emulsions. Examples of non-aqueous solvents are propylene glycol, polyethylene glycol, vegetable oils or injectable organic esters such as ethyl oleate. Aqueous vehicles include water, alcohol/water solutions, emulsions or suspensions.

In a particular embodiment, the acyl-protein thioesterase inhibitor APT1, ML-348, or the pharmaceutical composition is for use in the treatment and/or prevention of a disease or disorder related to impaired intracellular trafficking between the endoplasmic reticulum and the Golgi apparatus and between the latter and the plasma membrane.

BRIEF DESCRIPTION OF THE DRAWINGS

To better illustrate the object of the present invention, the following examples will now be described below, by way of illustration and not limitation, in connection with the appended drawings.

On these drawings:

FIG. 1A is a schematic representation of the RUSH KDEL-GPI-mCherry system.

FIG. 1B is a graph representing the quantification of Golgi fluorescence at each time point in StHdh$^{Q7/Q7}$ (circles) and StHdh$^{Q111/Q111}$ (squares) striatal cells. Panels below the curves represent GPI trafficking within the Golgi apparatus.

FIG. 1C represents the kinetics of cells expressing the GPI-KDEL-mCherry plasmid from the addition of biotin at t=0 until 90 minutes after biotin addition (scale bar=10 μm).

FIG. 2A is a schematic representation of the palmitoylation/depalmitoylation reaction catalyzed by palmitoyl-acyl-transferases (PATs) and acyl-protein thioesterases (dePATs). The major dePATs and their inhibitors are shown in the right panel.

FIG. 2B is a graph representing fluorescence quantification in the Golgi depending on time after biotin addition on StHdh$^{Q7/Q7}$ (circles), StHdh$^{Q111/Q111}$ (squares) and StHdh$^{Q111/Q111}$ cells treated 1 hour with 10 μM Palmostatin B (triangles).

FIG. 2C is a graph representing fluorescence quantification in the Golgi depending on time after biotin addition on StHdh$^{Q7/Q7}$ (circles), StHdh$^{Q111/Q111}$ (squares) and StHdh$^{Q111/Q111}$ cells treated 1 hour with 10 μM ML-348 (triangles).

FIG. 2D is a graph representing fluorescence quantification in the Golgi depending on time after biotin addition on StHdh$^{Q7/Q7}$ (circles), StHdh$^{Q111/Q111}$ (squares) and StHdh$^{Q111/Q111}$ cells treated 1 hour with 10 μM ML-349 (triangles).

FIG. 2E is a schematic representation of the palmitoylation/depalmitoylation reaction catalyzed by palmitoyl-acyl-transferases (PATs) and acyl-protein thioesterases (dePATs). The gene silencing of acyl-protein thioesterases is schematically shown in the right panel.

FIG. 2F is a graph representing fluorescence quantification in the Golgi depending on time after biotin addition on StHdh$^{Q7/Q7}$ cells with si-CTRL (circles), StHdh$^{Q111/Q111}$ with si-CTRL (squares) and StHdh$^{Q111/Q111}$ cells with si-APT1 (triangles).

FIG. 2G is a graph representing fluorescence quantification in the Golgi depending on time after biotin addition on StHdh$^{Q7/Q7}$ cells with si-CTRL (circles), StHdh$^{Q111/Q111}$ with si-CTRL (squares) and StHdh$^{Q111/Q111}$ cells with si-APT2 (triangles).

FIG. 3A is a schematic representation of the microfluidic devices used to reconstruct the in vitro corticostriatal network and treatment conditions.

FIG. 3B is a schematic representation of the video recording area for BDNF-mCherry trafficking.

FIG. 3C is kymographs showing BDNF-mCherry axonal trafficking obtained from wild-type and Hdh$^{CAG/+}$ cells treated or not with ML-348.

FIG. 3D is a graph showing the anterograde and retrograde velocities of BDNF-mCherry transport.

FIG. 3E is a graph representing the number of anterograde and retrograde vesicles moving along 100 μm of axon.

FIG. 3F is a graph representing the flow rate.

FIG. 3G is a graph representing the linear net flow.

FIG. 3H is a schematic representation of the microfluidic device and the recording area for PSD95 and SYP synaptophysin.

FIG. 3I is a graphic representation of the number of adjacent PSD95 and SYP spots along 100 μm of neurite.

FIG. 3J is a schematic representation of the microfluidic device in a cortical neuron stimulation situation where phosphoERK (pERK) labeling is performed within the post-synaptic compartment.

FIG. 3K is a graph representing the quantification of pERK immunopositive cells.

FIG. 3L is a graphic representation of ML-348 toxicity as evidenced by MTT (3-(4,5-dimethylthiazol-2-yl)-2,5-diphenyl tetrazolium bromide) salt assay: absorbance at 595-690 nm of mouse cortical neuronal cells depending on ML-348 concentration (from 100 nM to 100 μM) allows to quantify the number of live, metabolically active cells.

FIG. 3M is another graphic representation of MTT assay results on mouse cortical neuronal cells: negative control (neurobasal medium NB+B27), positive control (neurobasal medium NB+B27+1% DMSO), and cells in the presence of 1 μM ML-348 in neurobasal medium NB+B27.

FIG. 4A is a schematic representation of the intraperitoneal injection of ML-348 (2 mg/kg) into mice, followed by brain extraction at t=0, 30, 60, and 180 minutes prior to pharmacokinetic analysis.

FIG. 4B is a graphic representation showing the plasma concentration of ML-348 over time.

FIG. 4C is a graphic representation showing the brain concentration of ML-348 over time.

FIG. 4D is a schematic representation of palmitoylated protein immunoprecipitation by the ABE (Acyl-Biotin-Exchange) method in which a brain lysate is subjected to sequential ABE to biotinylate palmitoylated proteins prior to immunoprecipitation with streptavidin-coated beads.

FIG. 4E shows the electrophoretic gel migration after ABE of a brain lysate from mice injected with a control solution or with 0.3 mg/kg ML-348 solution on an unstained gel.

FIG. 4F shows the electrophoresis gel migration after ABE of a brain lysate from mice injected with a control solution or with 0.3 mg/kg ML-348 solution in the presence of streptavidin-HRP. FIG. 4F shows the palmitoylation of brain proteins after injection of ML-348 compared with the control (CTRL).

FIG. 4G is an electrophoresis gel showing the constant level of APT1 before and after ML-348 injection.

FIG. 5A is a schematic representation of the experimental program (O/F: Open Field, HL: Horizontal Ladder, NSF: Novelty-Suppressed Feeding).

FIG. 5B is a graph representing the number of entries in the central area of an Open Field test apparatus over a 60-minute period.

FIG. 5C is a graph representing the latency to feeding measured over a 10-minute period after entry into the NSF test area.

FIG. 5D is a graph representing spontaneous locomotion of mice as total distance traveled over 60 minutes during the Open Field test.

FIG. 5E is a graphic representation of the average error score and average ladder crossing time for the Horizontal Ladder test to highlight motor skills.

FIG. 5F is a graphic representation of the average speed achieved by mice on an accelerated speed rotarod apparatus and the number of falls on a fixed speed rotarod machine.

FIG. 6A is a graphic representation of synaptic density measured as the number of adjacent spots of PSD95 and Vglut-1 on neurons from wild-type vs. Hdh$^{CAG/+}$ mice.

FIG. 6B shows the results of the ABE assay on neurons from wild-type vs. Hdh$^{CAG/+}$ mice with or without ML-348 treatment.

FIG. 7A is a schematic representation of the microfluidic devices used to reconstruct the corticostriatal network in vitro and the treatment conditions.

FIG. 7B represents z-axis projections and associated kymographs showing BDNF-mCherry axonal trafficking obtained from cortical neurons derived from human induced pluripotent stem cells treated with DMSO (control) vs. ML-348.

FIG. 7C is a graphic representation of the BDNF-mCherry transport analysis results, namely the anterograde and retrograde velocities of BDNF-mCherry vesicle transport, the number of anterograde and retrograde vesicles moving along 100 μm of axon, and the linear net flux.

DESCRIPTION OF THE PREFERRED EMBODIMENTS

FIG. 1 shows that intracellular dynamics are delayed in Huntington's disease.

Referring to FIG. 1A, it can be seen that GPI (glycosylphosphatidyl inositol) is fused with SBP (Streptavidin-Binding Peptide) and a fluorescent marker mCherry (mChr) to form the "Reporter". The Reporter is retained in the endoplasmic reticulum using the hook part (KDEL-Streptavidin, shaded). Addition of biotin at t=0 releases the Reporter and allows it to be trafficked through the secretory pathway after leaving the endoplasmic reticulum to the Golgi apparatus (t~16 min) and then the plasma membrane (t~60 min).

In FIG. 1B, the inventors studied the trafficking of the GPI-SBP-mCherry Reporter by real-time imaging for 90 min in StHdh$^{Q7/Q7}$ (circle) and StHdh$^{Q111/Q111}$ (square) cells. Numbers on the X axis represent the time when Golgi fluorescence is strongest for each cell type. The numbers on the horizontal arrow indicate the time elapsed for fluorescence to cross the Golgi for each cell type. Thus, it was observed that the fluorescence peak was at 16.6 minutes for striatal cells from StHdh$^{Q7/Q7}$ mice, while it was delayed to 23.6 minutes in StHdh$^{Q111/Q111}$ cells mimicking the Huntington's disease phenotype. From the graph and fluorescence microscopy images, it is apparent that the Reporter exhibits prolonged retention in the Golgi apparatus in StHdh$^{Q111/Q111}$ cells.

In FIG. 1C, the kinetics of appearance and disappearance of mCherry fluorescence in the Golgi apparatus can also be observed, with reduced trafficking from the endoplasmic reticulum to the Golgi for StHdh$^{Q111/Q111}$ cells as well as the prolonged retention described above, the detection of mCherry fluorescence being possible well after 40 minutes after biotin addition.

FIG. 2 shows that APT1 acyl-protein thioesterase inhibitors restore intracellular dynamics in Huntington's disease.

Referring to FIG. 2A, there are inhibitory molecules of the depalmitoylases (acyl-thioesterases) APT1 and APT2: Palmostatin B, non-specific, and ML-348, specific inhibitor of APT1 and ML-349, specific inhibitor of APT2.

In FIG. 2B, it can be seen that treatment with 10 μM Palmostatin B for 1 hour on StHdh$^{Q111/Q111}$ cells (triangles) restores the kinetics from the endoplasmic reticulum to the Golgi apparatus: 18 min after biotin addition for the appearance of the fluorescence peak in the Golgi vs 23.3 min without treatment (squares). Palmostatin B treatment also decreases the time it takes for fluorescence to leave the Golgi apparatus (21.3 min vs 25.4 min without treatment).

In FIG. 2C, the inventors studied similar effects of ML-348 on kinetics: 18.9 min after biotin addition for the appearance of the fluorescence peak in the Golgi vs. 23.2 min without treatment. ML-348 treatment also decreases the retention time in the Golgi to a value identical to that obtained in wild-type cells (15.1 min), in contrast to 24 min for untreated StHdh$^{Q111/Q111}$ cells.

In contrast, in FIG. 2D, treatment with ML-349 (APT2-specific inhibitor) shows no effect on kinetics from the endoplasmic reticulum to the Golgi apparatus or on the retention time in the Golgi.

These results suggest that inhibition of APT1 rather than APT2 is capable of restoring endoplasmic reticulum to plasma membrane trafficking that is altered in Huntington's disease affected cells.

The inventors then proceeded to demonstrate that treatment with specific inhibitors of APT1 and APT2 (FIG. 2E) did indeed play an inhibitory role on the activity of these enzymes. Gene silencing by specific siRNAs (FIGS. 2F and 2G, triangles), si-APT1 and si-APT2, results in restoration of ER to Golgi trafficking and lack of retention of mCherry fluorescence in the Golgi apparatus in the case of si-APT1 (FIG. 2F), and later arrival in the Golgi and retention of fluorescence at this level in the case of si-APT2 (FIG. 2G). These results underline that ML-348 and ML-349 inhibitors used in the experiment do have an inhibitory action on their specific target enzymes, and that only the inhibition of APT1 has an effect on the cells affected by Huntington's disease and is a target of interest for the prevention and treatment of the disease.

FIG. 3 shows the effect of chronic treatment with ML-348 on the corticostriatal network.

Referring to FIG. 3A, the inventors have reproduced the corticostriatal network in vitro on a microfluidic device consisting of two neuronal chambers that are connected via microchannels. Experiments are performed over a period of time ranging from 2 to 12 days in vitro (Days in vitro), i.e. DIV2 to DIV12, and a fixation/acquisition at DIV12.

According to FIG. 3B, the inventors treated neurons with 1 μM of ML-348 daily inside the microfluidic device and axonal transport analysis of BDNF-mCherry was performed in the distal part of long microchannels.

In FIG. 3C, kymographs show the axonal trafficking of BDNF-mCherry obtained from wild-type and Hdh$^{CAG/+}$ cells treated or not with ML-348. The defect in BDNF axonal transport in untreated Hdh$^{CAG/+}$ cells can be observed, which transport is restored at least in part by ML-348 treatment to substantially the one observed for untreated wild-type control cells.

Similarly, in FIGS. 3D to 3G, it can be seen that axonal transport defects in Hdh$^{CAG/+}$ neurons (Huntington's disease) affecting anterograde and retrograde transport velocities of BDNF-mCherry, the number of anterograde and retrograde vesicles moving over a distance of 100 μm for 30 seconds as well as the linear net flow are restored to values approximately equal to those of the wild type when the Hdh$^{CAG/+}$ network is treated with ML-348.

In FIG. 3H, we can see the recording area that was chosen for the assessment of synapse density by quantifying the number of synaptophysin (SYP) spots, a presynaptic marker, and the number of PSD95 spots, a postsynaptic marker. FIG. 3I testifies that in the Hdh$^{CAG/+}$ microfluidic network, the number of synapses is decreased in the microfluidic devices. ML-348 treatment of the wild-type network slightly reduced synapse connectivity, but this result was not statistically significant. In contrast, ML-348 treatment of the Hdh$^{CAG/+}$ network restored the number of synapses approaching that of the wild-type network. Double immunofluorescent labeling of SYP and PSD95 shows that the colocalization of the markers within the microchamber is restored in the ML-348 treated Hdh$^{CAG/+}$ network. This is indicative of a restoration of synapse number by ML-348 in the Hdh$^{CAG/+}$ network (data not shown).

In FIG. 3J, one can visualize the recording area that was chosen for the analysis of the postsynaptic compartment in the situation of stimulation of cortical neurons with glycine/strychnine for 15 minutes.

FIG. 3K is a graphic representation of the percentage of immunopositive phosphoERK cells in the postsynaptic space. ML-348 treatment of Hdh$^{CAG/+}$ neurons allowed to restore postsynaptic signaling to values encountered in wild-type neurons. Dual pERK labeling/DAPI staining allows to visualize the strong inhibition of pERK labeling in the untreated Hdh$^{CAG/+}$ network, which is lifted by ML-348 treatment that restores labeling to values equivalent to those in the wild-type network (data not shown).

The previous results thus demonstrated that the APT1 inhibitor, ML-348, restores the presynaptic, synaptic and postsynaptic events that are altered in the corticostriatal network in Huntington's disease, confirming the major therapeutic interest of this molecule.

FIG. 3L shows the non-toxic effect of ML-348 treatment on neuronal cells in the mouse cortex using the MTT tetrazolium salt assay (3-(4,5-dimethylthiazol-2-yl)-2,5-diphenyl tetrazolium bromide). Thus, for ML-348 concentrations of 100 nM, 1 µM or 10 µM, no effect was observed on cell viability. Only the 100 µM concentration was found to be toxic over a period of 48 hours, and was discarded. Treatment of neuronal cells with ML-348 1 µM showed no toxicity, and this for 12 days.

In FIG. 3M, MTT assay results on cultured mouse cortex neurons after chronic treatment up to DIV12 indicate that the concentration used of ML-348 (1 µM) is not toxic for neurons. Indeed, the optical density assay at 595-690 nm by spectroscopy indicates that the relative amount of living and metabolically active neurons is approximately the same between controls (CTRL1 and CTRL2) and ML-348 treated cells.

FIG. 4 highlights that ML-348 is functional after injection.

Referring to FIG. 4A, the inventors injected mice intraperitoneally with ML-348 (2 mg/kg) and analyzed the pharmacokinetics of the molecule. They measured by LC-MS/MS after 30, 60 and 180 minutes the plasma concentration (FIG. 4B) and the amount in the brain (FIG. 4C) of ML-348. This experiment demonstrated that ML-348 effectively crosses the blood brain barrier as shown by the [Brain]/[Plasma] values in the table in FIG. 4C. Furthermore, the molecule is rapidly degraded 60 minutes after intraperitoneal injection. The ability of the ML-348 molecule to freely cross the blood brain barrier is an additional argument towards the efficacy of the molecule in vivo in mice.

In FIG. 4D, the graphic representation of the experiment set up to test the efficacy of the molecule to increase the level of palmitoylation in the brain 30 minutes after injection can be visualized. An ABE (Acyl-Biotin-Exchange) test was performed on a brain lysate from mice injected with a 0.3 mg/kg ML-348 solution (or a control solution): the palmitoylated proteins are first biotinylated before being immunoprecipitated by streptavidin coated beads.

As a result, it can be observed by comparison between a gel without labeling (FIG. 4E) and a gel in the presence of streptavidin-HRP (FIG. 4F) that the level of palmitoylation in brain lysates was increased. In contrast, the gel in FIG. 4G indicates that the expression level of the APT1 enzyme was not different between untreated control and ML-348-treated brain lysates (comparison with the expression level of tubulin).

FIG. 5 shows the effects of ML-348 treatment on anxiety-depressive (5B-5C) and motor (5D-5F) behaviors in Huntington's disease model mice (Hdh$^{CAG140/+}$) vs. wild-type (WT) mice.

Referring to FIG. 5A, the different behavioral tests performed on 7-month-old mice between 16 and 28 days post-implantation of a subcutaneous micropump (chronic treatment by constant subcutaneous injection of ML-348) can be visualized. The experimental program includes the following tests: O/F: Open Field, HL: Horizontal Ladder, Rotarod and NSF: Novelty-Suppressed Feeding.

Initially, in FIG. 5B, the results of the Open Field test are expressed as the number of entries into the central area over a 60-minute period. This test is established to test anxiety-related behaviors. The inventors found that the number of entries into the center area was slightly lower in Hdh$^{CAG/+}$ mice compared to wild-type mice. However, these differences were found to be statistically insignificant, assuming that the Huntington's disease-related anxiety phenotype is not detectable at 7 months in mice. Treatment with ML-348 also had no significant effect in any group of mice.

In FIG. 5C, the inventors studied anxiety and depression-related behaviors using the NSF test (new environment feeding test after food deprivation), which is indicative of anxious and depressive stages. The latency to food intake in a new environment was significantly longer for Hdh$^{CAG/+}$ mice compared to wild-type mice and treatment with ML-348 restores the behavior of Hdh$^{CAG/+}$ mice to that of wild-type mice. These observations suggest that ML-348 has a significant effect on the anxious and depressive behaviors induced by Huntington's disease.

In addition to the tests focusing on anxious and depressive behaviors, additional tests were performed on the mice to assess their motor behaviors (FIGS. 5D-5F). In FIG. 5D, the graph represents the spontaneous locomotion of the mice as the total distance traveled for 60 minutes in the Open Field test. It can be seen that the distance traveled was slightly lower for Hdh$^{CAG/+}$ mice compared to wild-type mice, but this difference was not estimated to be statistically significant.

FIG. 5E represents the average error score and the average time to cross the ladder of the Horizontal Ladder test. This test investigates the motor coordination of the forelimbs and hindlimbs of mice. It can be noted that the Hdh$^{CAG/+}$ mice showed significant defects in this task as evidenced by the high error scores and the increase in ladder crossing time. An improvement in the performance of mice is made possible by the ML-348 treatment.

FIG. 5F depicts, in the top panel, the average speed achieved (in rotations per minute, rpm) by the mice on a rotarod apparatus at an accelerated speed, from 4 to 40 rpm in 600 seconds, from 4 to 40 rpm in 300 seconds, and from 4 to 40 rpm in 120 seconds, respectively. It is observed that Hdh$^{CAG/+}$ mice treated with ML-348 recover motor coordination close to that of wild-type mice, especially in the 300 s condition where the results were found to be statistically significant. In the bottom panel, the average speed achieved by the mice is studied on a fixed rotarod apparatus at constant speed of, respectively, 10 rpm, 15 rpm and 20 rpm. At a high speed on a fixed speed rotarod (20 rpm), no significant difference was shown between wild type and Hdh$^{CAG/+}$ mice, however, at a lower speed (10 and 15 rpm), ML-348 significantly improved the performances of Hdh$^{CAG/+}$ mice since the observed values were similar to those of untreated wild type mice.

FIG. 6 shows the increase in synapse density and palmitoylation after 28 days of ML-348 treatment.

FIG. 6A quantifies the post-mortem synapse density on neurons from control mice or after 28 days of ML-348 treatment using the number of PSD95 and Vglut-1 adjacent dots per 100 µm². We note that there is a significant reduction in this number of adjacent spots in untreated Hdh$^{CAG/+}$ mice. Treatment with ML-348 restores synaptic density to a level approximately equal to that of untreated wild-type mice. (WT CTRL=36; WT ML-348=36; HdH$^{CAG/+}$ CTRL=36; HdH$^{CAG/+}$ ML-348=36; F3,140=3.65, *p<0.05).

FIG. 6B represents the results of an ABE assay on immunoprecipitates from WT and HdH$^{CAG/+}$ mouse brains, with or without ML-348 treatment. After the second immunoprecipitation with streptavidin-HRP coated beads, it can be seen, by comparison of the bands obtained on gel in the presence of hydroxylamine (+HAM) and in its absence (−HAM), that the treatment with ML-348 on HdH$^{CAG/+}$ mice does increase palmitoylation. Indeed, a protein is presumed to be palmitoylated if it is detected by blotting with streptavidin-HRP in the +HAM condition but if no specific signal is detectable in the −HAM condition.

FIG. 7 shows the effect of ML-348 treatment on BDNF trafficking in cortical neurons derived from human induced pluripotent stem cells (iPSCs) from Huntington's disease patients.

Referring to FIG. 7A, the inventors again reproduced the corticostriatal network in vitro on a microfluidic device consisting of two neuronal chambers that are connected via microchannels. Experiments are performed over a period ranging from 0 to 40 days in vitro (DIV), the first 20 days for neuronal cell generation and differentiation of hiPSCs, followed by the introduction of the cells into the microfluidic device. 3 hours after introduction, cells were infected from the pre-synaptic compartment with a lentivirus encoding BDNF-mCHerry. After 7 to 10 days of culture, the formation of corticocortical contacts was observed in the synaptic compartment, generating a human corticocortical circuit typical of Huntington's disease. 13 days after introduction, the presynaptic, synaptic, and postsynaptic compartments of the microchambers were treated with 1 µM ML-348 daily for 7 days.

In FIG. 7B, the recordings and their kymographs show axonal trafficking of BDNF-mCherry vesicles in the distal part of the presynaptic microchannels that contain only cortical axons. The defect in BDNF axonal transport can be observed in DMSO-treated cells, which transport is restored at least in part by ML-348 treatment.

Similarly, in FIG. 7C, it can be observed that axonal transport defects in cortical neurons derived from human iPSCs (Huntington's disease) affect anterograde and retrograde BDNF-mCherry transport velocities, the number of anterograde and retrograde vesicles moving over a distance of 100 µm and this for 30 seconds, as well as the linear net flow. The results obtained for anterograde and retrograde transport velocities of BDNF-mCherry vesicles were not statistically significant (N=number of axons per condition in at least two independent experiments: N=47 controls, N=52 ML-348; anterograde: p=0.4892, retrograde: p=0.1776 by t test). In contrast, the number of vesicles moving in either direction (anterograde: p=0.0068, retrograde: p=0.0026, Mann-Whitney *p<0.01) and linear net flow (p=0.0313, Mann-Whitney *p<0.05) were significantly increased by ML-348 treatment.

EXAMPLES

The following examples illustrate the invention.

Materials and Methods

Animals

The following experiments are performed on Hdh$^{CAG140/+}$ knock-in mice that are generated on a 057-BL6J genetic background and express human Huntingtin HTT exon 1 sequence (SEQ ID NO:1) with 140 CAG repeats. Wild-type WT and Hdh$^{CAG140/+}$ knock-in mutant mice were maintained with access to food and water ad libitum and kept at constant temperature (19-22° C.) and constant humidity (40-50%) on a 12 h:12 h light/dark cycle. All experimental procedures were performed in an authorized facility in accordance with the recommendations of the European Economic Community (Directive 86/609/EEC) and the French National Committee (transposition of the European Directive 2010-63UE) for care and use of laboratory animals under the supervision of authorized investigators.

Huntington's Disease Model Cells

StHdh$^{Q111/Q111}$ cells are striatal cells immortalized from Hdh$^{Q111/Q111}$ mice. This mouse model is a knock-in model that expresses the human Huntingtin HTT exon 1 sequence (SEQ ID NO:1) with 111 CAG repeats.

RUSH System

The RUSH plasmid (Boncompain et al., 2012) is a bicistronic plasmid (SEQ ID NO: 2) allowing the expression of two parts of the system: the reticulum-specific anchor (KDEL-streptavidin), and the reporter part (GPI-SBP-mCh). The addition of biotin in the extracellular medium (40 µM) induces the unhooking of the reporter part of the anchor, thus allowing to follow the intracellular trafficking in a synchronized way within a cell population from the endoplasmic reticulum.

Treatments

ML-348 (Tocris-5345), Palmostatin B (Merck Millipore-178501), and ML-349 (obtained from Martin Brent) were diluted in 100% DMSO for primary concentration.

For striatal StHdh cells, acute treatment was performed at 10 µM for 1 hour before and during the acquisition time. For neurons within the microchambers, treatments were started at DIV2 until DIV12 every day at 1 µM in each compartment of the microfluidic device.

In mice, an infusion of ML-348 or control solution (saline+DMSO) for 28 days at 0.3 mg/kg/day was performed using an osmotic pump (mini osmotic pump from Alzet, 2004) implanted subcutaneously on the back of the mouse.

Behavioral Tests

Mice littermates were grouped into mixed treatment groups. Males and females were 6 months of age at the beginning of the treatment. For each specific test, all experimental groups were tested on the same day, during the light phase and between Days 16 and 28 of treatment. Prior to testing, mice were acclimatized to the test room for a period of 30 minutes. Treatments were randomly assigned and behavioral tests were performed 12 days before the end of the delivery of the treatment. Four experimental groups were defined: WT CTRL (wild-type controls: 13 mice: 7 males and 6 females), WT ML-348 (ML-348-treated wild-type mice: 12 mice: 7 males and 5 females), Hdh$^{CAG/+}$ CTRL (Hdh$^{CAG/+}$ control mice: 14 mice: 6 males and 8 females), and Hdh$^{CAG/+}$ ML-348 (Hdh$^{CAG/+}$ mice treated with ML-348: 15 mice: 6 males and 9 females). Mice were excluded from analysis if their performance was calculated as a significant outlier by the Grubb test. One mouse was excluded based on these criteria. Mouse weights were measured prior to the start of treatment and until the end of testing.

Open Field Test

Spontaneous locomotion was measured as the total distance traveled and general anxiety as the number of entries into the internal area. The Open Field test was conducted in a opaque Plexiglas square chamber (50×50 cm) and the internal chamber was defined with a quadrangular shape of 12.50×12.50 cm. The mice were filmed for 60 minutes. The distance traveled and the number of entries into the internal chamber per 5-minute interval were measured using View-Point tracking software.

Rotarod Test

The Rotarod apparatus was used to measure motor coordination and balance. Rotarod test was performed over 6 consecutive days, with 3 days of accelerated rotarod and then 3 days of fixed rotarod. For the accelerated rotarod, on the first day, mice were subjected to 3 trials at increasing speeds from 4 rpm (rotation per minute) to 40 rpm over 600 sec, on the second day, mice were subjected to 3 trials at increasing speeds from 4 rpm to 40 rpm over 300 sec and on the third day, mice were subjected to 3 trials at increasing speeds from 4 rpm to 40 rpm over 120 sec. Each trial was followed by 5 minutes of rest. The latency and speed at which mice fall off from the rotarod were measured up to 300 sec. For a fixed rotarod, mice were evaluated for 3 trials at 10, 15, and 20 rpm on days 4, 5, and 6, respectively. During 300 sec, animals were put back on the rotarod each time they fell off. Each trial was separated by a 15-min resting period. The latency to the first fall and the number of falls were reported. Data are expressed as the average of the 3 trials.

Horizontal Ladder Test

A horizontal ladder is used to assess forelimb and hindlimb placement and coordination. The horizontal ladder is composed of two clear Plexiglas walls (69.50×15 cm) containing metal rungs (0.2 cm diameter) irregularly spaced (between 0.5 and 2 cm apart). Mice were habituated to walk on a horizontal ladder during two consecutive days (3 trials per day). Then the mice were tested (3 trials) with a different pattern than the two days of habituation. Test trials were videorecorded, and the motor performance as well as the latency to complete the task were quantified. Data are expressed as the average of the 3 trials.

Novelty-Suppressed Feeding Test

The test was performed as in Pla et al., 2013. Animals were food-deprived during 24 hours to increase motivation to consume food. On the day of testing, mice were placed within the testing apparatus, which consisted of a plastic box (50 cm×30 cm×15 cm), the floor of which covered with wooden bedding. Mice were videorecorded and allowed to freely explore the area until they eat the food pellet or for a maximum of 10 minutes. The mice were considered to eat the pellet when they bite the pellet while sitting comfortably.

ABE (Acyl-Biotin-Exchange) Assay

Brains were mechanically lysed in ice-cold buffer (1% IGEPAL CA-630; 50 mM Tris-HCl pH 7.5, 150 mM NaCl, 10% glycerol) containing 1:100 protease inhibitor cocktail (Sigma Aldrich P8340), 1 mM PMSF, 1:200 phosphatase inhibitor (Sigma Aldrich P5726), and 50 mM NEM (Sigma Aldrich E3876) to block free cystein. Brain lysates were rotated at 4° C. for 30 minutes before insoluble material was removed by centrifugation at 15.000 rpm for 10 minutes. Lysates were precleared by incubation with Dynabeads M-280 Streptavidin (Invitrogen 112.05D) for 30 minutes at 4° C. on the wheel. Proteins from precleared samples were then precipitated using chloroform-methanol assay. Each pellet was divided and resuspended in +HAM (2:3 of the pellet) (lysis buffer containing 1 mM HAM (Sigma 46780-4)) or −HAM (1:3 of the pellet) during 1 hour at room temperature on the wheel. Proteins were precipitated with chloroform-methanol method and the pellets were resuspended in Biotin-BMCC buffer (lysis buffer with 5 μM EZ-Link™ Biotin-BMCC (Thermo Fisher 21900)) for 1 hour at room temperature on the wheel. Then, proteins were further precipitated with chloroform-methanol method and the pellets were resuspended in lysis buffer. Palmitoylated proteins were immunoprecipitated with Dynabeads M-280 Streptavidin (Invitrogen 112.05D) for 30 minutes at 4° C. with rocking. Proteins were eluted by boiling the samples with eluent buffer (2.5% SDS, 2.5% glycerol, 62.5 mM Tris HCl pH 6.8, 0.005% bromophenol blue and 5 mM DTT). Samples were loaded onto a 12% acrylamide stain-free gel followed by SDS-PAGE electrophoresis and transfer to nitrocellulose. Stain free gel without labeling revealed the loading control and palmitoylation was detected using HRP-conjugated streptavidin 1:10000 (Thermo Fisher Scientific 21126). To detect APT1 level the primary antibodies used were: anti-APT1 1:1000 (Abcam ab91606) and anti-α-tubulin 1:1000 (Sigma Aldrich T9026).

Mass Spectrometry Analysis

Plasma proteins were precipitated by adding 800 μL acetonitrile into 400 μL of sample. Brains were ground into 400 μL $H_2O$ before adding 800 μL acetonitrile. Samples were centrifuged to remove insoluble residues at 15.000 g for 5 minutes at 16° C. Supernatants were analyzed by LC-MS/MS. LC-MS/MS was assessed by high-performance liquid chromatography (UHPC) coupled with a triple quadrupole (Shimadzu LC-MS 8030). Analyses were performed from 3 mice for each time point.

Toxicity Assay

Toxicity was assessed using the tetrazolium salt MTT assay. The cortical culture was treated every day as previously described. After treatment, a solution of MTT (Life M6494) was added to the culture medium at 1.2 mM and incubated for 3 hours. The reaction was terminated by adding the solvent solution (4 mM HCl, 0.1% NP40 in isopropanol). The absorbance value was measured at 595 and 690 nm.

Generation of Cortical Neuron Precursors from Human Induced Pluripotent Stem Cells (hiPSC)

The human iPSC line ND42222 (RRID:CVCL_Y844 passage 42) "109Q" was obtained from Coriell Cell Repositories. This line is heterozygous for HTT p.Gln18[109] and therefore has 109 CAG repeats in one of the two HTT alleles. Amplification of human iPSCs, generation of neuronal cells and terminal differentiation were performed according to the work published in Gribaudo S. et al. (Stem Cell Reports 12, 230-244, 2019). 109Q cells were maintained on Vitronectin-coated plates (Life Technology) in mTeSRplus medium (STEMCELL Technologies). Cultures were fed every other day and passaged by manual dissociation using 0.02% EDTA pH 7.2 (Merck Sigma-Aldrich) every 4-5 days. For neuronal differentiation, hiPSC colonies were treated (DIV0) as previously described (Nicoleau et al., 2013) in N2B27 medium consisting of 50% DMEMF-12 Glutamax, 50% neurobasal medium, 2% B27 supplement 50× without vitamin A, 1% N2 supplement, 0.1% penicillin streptomycin, and 50 μM β-mercaptoethanol (Thermofisher). Neuronal differentiation was initiated by passage of hiPSCs in N2B27 medium supplemented with SB431542 (20 μM, Tocris), LDN-193189 (100 nM, Sigma Aldrich) and XAV_939 (1 μM, Tocris) and 10 μM ROCK inhibitor (Y27632, Calbiochem) on low-adhesion culture plates (Greiner) for 6 hours. The medium was changed every day from DIV0 to DIV20. At DIV1, hiPSC aggregates were transferred to laminin poly-ornitine-coated dishes without Y27632. From DIV5 to DIV9, SB431542 was removed and FGF2 (10 ng/ml) and cyclopamine 1 μM (Merck) were added. From DIV10 to DIV20, LDN-193189 and XAV-939 were removed and CHIR99021 0.4 μM (Stemgent) was added. At DIV20, cortical neuron precursor cells were enzymatically dissociated using Accutase (Invitrogen), resuspended at $5\times10^6$ cells/ml in Cryostor cell cryopreservation medium (Merck), frozen and stored in liquid nitrogen at $-150°$ C.

Neuronal Differentiation of hiPSC-Derived Cortical Neuron Precursor Cells in Microfluidic Devices Microfluidic devices were coated with poly-D-lysine (Merck) in the proximal and synaptic compartments and with poly-D-lysine/laminin (Thermofisher) in the distal compartment. Cortical neuron precursors were suspended in N2B27 medium supplemented with BDNF (20 ng/ml, Preprotech), cAMP (100 µM, Merck), DAPT (10 µM, Tocris), Cdk4i (1 µM, Merck) and ROCK inhibitor (Y-27632, Stemcell technologies) and plated at a final density of approximately 7000 cells/mm$^2$ in the distal compartment of the microfluidic chamber. Three hours after plating, cells were infected with a lentivirus encoding for BDNF-mCherry. The day after seeding, the medium was replaced with fresh N2B27 medium supplemented without the ROCK inhibitor. The medium was then changed every 7 days. Cells were exposed from DIV+13 to DIV+20 (after seeding in the microfluidic device) every day with 1 µM ML-348 or DMSO added in all three of the proximal, synaptic and distal compartments of the microfluidic device.

Statistical Analysis

GraphPad Prism software (GraphPad Software, Inc.) was used for statistical analysis. All experiments consisted of at least 3 independent replicate experiments. Data are expressed as mean+/−standard error. Groups were compared using a one-way analysis of variance, which was followed by Tukey's post-hoc analysis for multiple comparisons or two groups were compared using unpaired 2-tailed Student's t test. Data distribution was assumed to be normal. The criterion for significance was set at $p<0.05$.

Experimental Results

Endoplasmic Reticulum (ER) to Plasma Membrane Trafficking is Altered in Huntington's Disease The inventors used the Retention Using Selective Hooks (RUSH) system to study intracellular dynamics from the ER to the plasma membrane in Huntington's disease condition (FIG. 1A). RUSH allows tracking the synchronous release of a reporter molecule from specific intracellular compartments. In the present experiment, the inventors followed the release of glycosylphosphatidylinositol (GPI)-anchored fluorescence protein mCherry, and fused to streptavidin-binding peptide (SBP) that was retained into the ER compartment by the interaction with a "hook" protein composed of the KDEL motif fused to streptavidin. In the absence of biotin, the GPI-SBP-mCherry localizes at the ER (FIG. 1A). Addition of biotin to the cells expressing GPI-SBP-mCherry and KDEL-streptavidin causes a synchronous release of the GPI-SBP-mCherry reporter from the hook which then migrates to the Golgi apparatus and later to the plasma membrane.

To study these dynamics in the context of Huntington's disease, the inventors transfected the GPI-SBP-mCherry-KDEL-streptavidin construct as shown in SEQ ID NO:2 into immortalized striatal cells from Hdh$^{Q111/Q111}$ and Hdh$^{Q7/Q7}$ mice, referred to as StHdh$^{Q111/Q111}$ and StHdh$^{Q7/Q7}$ cells respectively. They then monitored GPI-SBP-mCherry trafficking by real-time imaging for 90 minutes. To assess intracellular trafficking dynamics, they quantified the kinetics of appearance and disappearance of mCherry fluorescence in the Golgi apparatus over time (FIGS. 1B and C). Shortly after biotin addition, GPI leaves the ER and moves to the Golgi apparatus. The inventors quantified fluorescence at the Golgi and observed that in StHdh$^{Q7/Q7}$ cells, the peak fluorescence was at 16.6 minutes, whereas it was delayed to 23.6 minutes in StHdh$^{Q111/Q111}$ cells (FIG. 1B). Their observations indicate a reduced trafficking of GPI from the ER to the Golgi apparatus as well as prolonged retention of GPI in the Golgi as evidenced by a longer period of GPI fluorescence in the Golgi apparatus. These results are in agreement with previous observations of altered trafficking between the endoplasmic reticulum and the Golgi apparatus and between the latter and the plasma membrane in Huntington's disease.

APT1 Inhibition Restores Trafficking from the Endoplasmic Reticulum to the Plasma Membrane As mentioned above, in Huntington's disease, there is a reduction in the palmitoylation of the Huntingtin HTT, as well as a reduction in the activity of the palmitoylating enzymes, HIP14 and HIP14L, suggesting that in addition to HTT itself, there is a global deregulation of cellular palmitoylation within neurons when HTT contains the polyQ stretch.

Although these results suggest that HIP14 and HIP14L may be potential targets of therapeutic interest, there are no molecules to enhance HIP14 activity. Instead, molecules that inhibit depalmitoylases (acyl-protein thioesterases) have been developed (FIG. 2A).

The inventors first tested the effect of Palmostatin B on intracellular kinetics using the RUSH system. They found that Palmostatin B restores the ER to Golgi apparatus kinetics and also decreases the time it takes for fluorescence to exit the Golgi apparatus (FIG. 2B). However, Palmostatin B is not specific for a given APT and targets both APT1 and APT2 with similar affinities ($IC50_{APT1}=5.4$ nM and $IC50_{APT2=37.7}$ nM). The inventors then observed that treatment with ML-348 (APT1 inhibitor) was able to restore the kinetics, while ML-349 (APT2 inhibitor) had no effect, suggesting that inhibition of APT1 rather than APT2 may restore the endoplasmic reticulum to plasma membrane trafficking that is altered in Huntington's disease-affected cells (FIGS. 2C and D). These results reveal that APT1 and not APT2 is specifically involved in the pathophysiological mechanisms of Huntington's disease and indicate that APT1 is a potential therapeutic target in Huntington's disease for restoring intracellular dynamics.

The results of the gene silencing experiment using small interfering RNAs directed against APT1 (si-APT1, FIG. 2F) and APT2 (si-APT2, FIG. 2G), respectively, help to confirm that the effects observed with ML-348 and ML-349 inhibitors on intracellular trafficking (FIG. 2C and FIG. 2D) are indeed due to inhibition of the enzymes responsible for APT1 and APT2 depalmitoylation.

APT1 Inhibition Restores Corticostriatal Network on a Chip

The inventors then investigated whether ML-348 is able to restore dysfunctions of the corticostriatal network in Huntington's disease. Indeed, corticostriatal circuit is particularly altered in Huntington's disease, which manifests itself by a dysfunction and a degeneration of both the striatal neurons and their corticostriatal afferences. They developed a microfluidic-based approach that enables the reconstruction of a time- and space-controlled neuronal network compatible with fast spinning confocal videomicroscopy. This system uses a silicon polymer-based microfluidic device composed of two fluidically-isolated neuronal chambers that are connected via a set of thin microchannels through which neurites can grow and contact each other in an intermediate synaptic compartment. Using primary neuron cultures, they reconstituted a corticostriatal network in which cortical neurons project to striatal target neurons through oriented axodendritic connections (FIG. 3A). These devices are compatible with drug treatment and therefore can be used to test pharmacological agents in vitro on this functional circuit.

First, the inventors tested the toxicity of ML-348 treatment on wild-type cortical cultures at 1 μM for 10 days. This assay revealed no toxicity at this concentration ($IC50_{APT1}$=230 nM) (FIG. 3M).

The inventors then treated neurons with 1 μM of ML-348 daily within the microfluidic device and measured the dynamics of BDNF-containing vesicles whose traffic is impaired in Huntington's disease. Cortical neurons from WT and $Hdh^{CAG/+}$ mice were infected with BDNF-mCherry lentivirus and acquisitions were performed at Day 12 in the distal part of the long microchannels to analyze axonal transport of BDNF (FIG. 3B). As expected, defects in axonal transport in HD (Huntington's disease) neurons were identified for both the anterograde and retrograde transport velocities, and also in the number of vesicles travelling along the microtubules (FIG. 3C-3E). These effects lead to a reduction of the linear net flux with no impact one the directionality of the vesicles (FIGS. 3F and 3G). The inventors observed that treatment of WT neurons with ML-348 had an inhibitory effect on BDNF trafficking similar to what is observed in $Hdh^{CAG/+}$ neurons. In contrast, they observed that treatment of $Hdh^{CAG/+}$ neurons with ML-348 restored all parameters of transport, including anterograde and retrograde transport velocities, vesicle number, linear flow rate and net flux to wild-type control values.

The inventors then assessed synapse density by quantifying the number of synaptophysin spots (presynaptic marker, SYP) adjacent to PSD95 spots (postsynaptic marker) within synaptic chamber of the microfluidic device using high-resolution Airyscan confocal microscopy (FIG. 3H). In $Hdh^{CAG/+}$ network, the number of synapses is decreased in the microfluidic devices (FIG. 3I). ML-348 treatment of the WT network slightly reduced synapse connectivity. However, this was not significant. Significantly, however, ML-348 treatment of $Hdh^{CAG/+}$ network restored the number of synapses back to the one of wild-type WT network (FIG. 3I). Double immunofluorescent labeling of SYP and PSD95 also enabled to visualize that colocalization of markers within the microchamber is restored in the ML-348 treated $Hdh^{CAG/+}$ network. This is indicative of a restoration of synapse number by ML-348 in the $Hdh^{CAG/+}$ network (data not shown).

Finally, the inventors determined the consequences of ML-348 treatment on the survival signaling within the postsynaptic compartment. They used ERK phosphorylation as the readout of the postsynaptic signaling. Indeed, several studies have shown defects in pERK signaling in the striatum under HD conditions. The inventors stimulated cortical neurons for 15 minutes with glycine/strychnine and quantified the percentage of striatal neurons immunopositive for phosphoERK (FIG. 3J). ML-348 treatment of $Hdh^{CAG/+}$ neurons restored postsynaptic signaling to values found in wild-type neurons (FIG. 3K). Furthermore, dual pERK labeling/DAPI staining enabled to visualize the strong inhibition of pERK labeling in the untreated $Hdh^{CAG/+}$ network, which is lifted by ML-348 treatment that restores labeling to values equivalent to those in the wild-type network (data not shown).

All these observations indicate that APT1 ML-348 inhibitor restores presynaptic, synaptic and postsynaptic events that are altered in the corticostriatal network in Huntington's disease, suggesting that this molecule has a therapeutic effect of interest in vivo.

ML-348 Treatment Increases Brain Palmitoylation

Before investigating ML-348 in vivo, the inventors first evaluated the pharmacokinetics of the molecule. They injected mice intraperitoneally with ML-348 and measured the plasma concentration and the brain quantity of ML-348 by LC-MS/MS after 30, 60, and 180 minutes (FIGS. 4A, 4B, and 4C). They found that ML-348 crosses efficiently the blood brain barrier as shown by the [Brain]/[Plasma] ratio values (FIG. 4C, table). However, the molecule was rapidly degraded 60 minutes after intraperitoneal injection (FIGS. 4B and 4C). They then evaluated the efficacy of the molecule to increase brain palmitoylation level 30 minutes after injection. For this purpose, they performed an Acyl-Biotin-Exchange (ABE) assay to biotinylate palmitoylated proteins before their immunoprecipitation with streptavidin-coated beads (FIG. 4D). After injection of ML-348 treatment, they observed that the level of brain palmitoylation was enhanced without a change in APT1 expression (FIG. 4E-4G). These results indicate that ML-348 readily crosses the blood brain barrier and effectively increases brain palmitoylation, suggesting the molecule to be efficient in vivo in mouse.

Chronic ML-348 μImproves Cognitive Deficits in $Hdh^{CAG/+}$ Mice

The inventors next evaluated the effects of chronic infusion of ML-348 during 28 days on Huntington's disease behavior (FIG. 5A). First, they assessed the consequences of chronic treatment on non-motor behavioral tests (FIGS. 5B-5C). Indeed, neuropsychiatric changes are prevalent among patients with Huntington's disease and these often occur before the onset of motor symptoms.

The inventors used the Open-Field (OF) protocol to test anxiety-related behaviors. They observed that the number of entries in the center of area was slightly lower in $Hdh^{CAG/+}$ mice compared to wild-type mice. However, the differences were not significantly different, suggesting that the anxious phenotype is not detectable at 7 months old (FIG. 5B). ML-348 treatment also had no significant effect on both $Hdh^{CAG/+}$ mice or wild-type mice. The inventors next investigated anxiety and depression-related behaviors using the novelty-suppressed feeding (NSF) paradigm, that is sensitive to both anxiety and depressive stages (FIG. 5C). The latency to feeding in a novel environment for $Hdh^{CAG/+}$ mice was significantly longer than that in untreated wild-type mice. Interestingly, the $Hdh^{CAG/+}$ treated with ML-348 mice behaved as wild-type mice, suggesting that ML-348 has a significant effect on Huntington's disease-induced anxiodepressive related behaviors (FIG. 5C).

Chronic ML-348 has Beneficial Effects on Motor Deficits in $Hdh^{CAG140/+}$ Mice.

The inventors next determined the effects of ML-348 on motor behavior. Spontaneous mouse locomotor activity was evaluated using the Open Field (OF) test. Total ambulatory distance traveled was slightly lower for $Hdh^{CAG/+}$ mice when compared to wild-type mice, although the difference was not significant at this stage. ML-348 had no effect on this task (FIG. 5D). The inventors next assessed motor coordination using the Horizontal Ladder (HL) test. $Hdh^{CAG/+}$ mice showed significant defects in this task, as shown by the high error rate and the average time to cross the horizontal ladder (FIG. 5E). A significant improvement was observed in the $Hdh^{CAG/+}$ mice treated with ML-348, as shown by decreases in error score values and the time to perform the task that were similar to values in wild-type mice (FIG. 5E). Finally, to confirm the beneficial effect of ML-348 on motor coordination, the inventors explored balance and motor coordination using rotarod test. High speed in fixed rotarod did not show any differences between wild-type and Hdh$^{CAG/+}$ mice (FIG. 5F). Interestingly, Hdh-$^{CAG/+}$ mice show significant alterations in motor coordination using rotarod at both accelerated (300 s condition) and constant speeds (10 and 15 rpm) (FIG. 5F). In these three tests, ML-348 significantly improved the performance of Hdh$^{CAG/+}$ mice as values were similar to those of the non-treated WT mice (FIG. 5F).

These results in HdhCAG/+ mice indicate that constant administration of ML-348 at a dose of 0.3 mg/kg during one month has significant effects on motor coordination.

ML-348 Restores BDNF Trafficking in Cortical Neurons Derived from Human iPSCs from Patients with Huntington's Disease The results presented in FIG. 7 indicate that treatment with ML-348 on cultured human-derived cortical neurons restores the defective axonal trafficking encountered in Huntington's disease. These results are promising for the therapeutic efficacy of ML-348 in neurodegenerative diseases affecting intracellular trafficking.

The invention claimed is:

1. A method for treating a neurodegenerative disease or disorder in a subject in need thereof, the method comprising administering to the subject a therapeutically effective amount of ML-348, wherein the therapeutic effect for the neurodegenerative disease or disorder is achieved by selective inhibition of Acyl-Protein Thioesterase 1 (APT1) activity without substantial concomitant inhibition of over Acyl-Protein Thioesterase 2 (APT2) activity, thereby restoring endoplasmic reticulum to Golgi apparatus trafficking in neuronal cells affected by the neurodegenerative disease or disorder.

2. A method for improving motor coordination in a subject having a neurodegenerative disease or disorder the method comprising chronically administering to the subject ML-348, at a dosage of about 0.3 mg/kg/day for a period of at least 28 days, wherein said ML-348 selectively inhibits Acyl-Protein Thioesterase 1 (APT1), over Acyl-Protein Thioesterase 2 (APT2) activity.

3. The method of claim 2, wherein the chronic administration is via subcutaneous infusion using an osmotic pump.

4. The method of claim 1, wherein the neurodegenerative disease or disorder is Huntington's disease.

5. The method of claim 2, wherein the neurodegenerative disease or disorder is Huntington's disease.

6. The method of claim 1 wherein the neurodegenerative disease or disorder is any one of Huntington's disease, Parkinson's disease, Amyotrophic Lateral Sclerosis or Charcot's disease (ALS), Rett's syndrome, Charcot-Marie-Tooth disease, motor-sensory axonal neuropathy, Perry's syndrome, early-onset autosomal dominant Alzheimer's disease (AD3), progressive supranuclear palsy syndrome (PSP), autosomal spastic paraplegia.

7. The method of claim 2 wherein the neurodegenerative disease or disorder is any one of Huntington's disease, Parkinson's disease, Amyotrophic Lateral Sclerosis or Charcot's disease (ALS), Rett's syndrome, Charcot-Marie-Tooth disease, motor-sensory axonal neuropathy, Perry's syndrome, early-onset autosomal dominant Alzheimer's disease (AD3), progressive supranuclear palsy syndrome (PSP), autosomal spastic paraplegia.

* * * * *

SEQUENCE LISTING

```
<160> NUMBER OF SEQ ID NOS: 2

<210> SEQ ID NO 1
<211> LENGTH: 408
<212> TYPE: DNA
<213> ORGANISM: Homo sapiens
<220> FEATURE:
<223> OTHER INFORMATION: Huntingtin exon 1

<400> SEQUENCE: 1
gctgccggga cgggtccaag atggacggcc gctcaggttc tgcttttacc tgcggcccag      60
agccccattc attgccccgg tgctgagcgg cgccgcgagt cggcccgagg cctccgggga     120
ctgccgtgcc gggcgggaga ccgccatggc gaccctggaa aagctgatga aggccttcga     180
gtccctcaag tccttccagc agcagcagca gcagcagcag cagcagcagc agcagcagca     240
gcagcagcag cagcaacagc cgccaccgcc gccgccgccg ccgccgcctc ctcagcttcc     300
tcagccgccg ccgcaggcac agccgctgct gcctcagccg cagccgcccc cgccgccgcc     360
cccgccgcca cccggcccgg ctgtggctga ggagccgctg caccgacc                 408

<210> SEQ ID NO 2
<211> LENGTH: 6038
<212> TYPE: DNA
<213> ORGANISM: Artificial Sequence
<220> FEATURE:
<223> OTHER INFORMATION: RUSH plasmid Str-KDEL_SBP-mCherry-GPI

<400> SEQUENCE: 2
gacggatcgg gagatctccc gatccctat ggtcgactct cagtacaatc tgctctgatg       60
ccgcatagtt aagccagtat ctgctccctg cttgtgtgtt ggaggtcgct gagtagtgcg     120
cgagcaaaat ttaagctaca acaaggcaag gcttgaccga caattgcatg aagaatctgc     180
ttagggttag gcgttttgcg ctgcttcgcg atgtacgggc cagatatacg cgttgacatt     240
gattattgac tagttattaa tagtaatcaa ttacggggtc attagttcat agcccatata     300
tggagttccg cgttacataa cttacggtaa atggcccgcc tggctgaccg cccaacgacc     360
cccgcccatt gacgtcaata atgacgtatg ttcccatagt aacgccaata gggactttcc     420
attgacgtca atgggtggac tatttacggt aaactgccca cttggcagta catcaagtgt     480
atcatatgcc aagtacgccc cctattgacg tcaatgacgg taaatggccc gcctggcatt     540
atgcccagta catgacctta tgggactttc ctacttggca gtacatctac gtattagtca     600
tcgctattac catggtgatg cggttttggc agtacatcaa tgggcgtgga tagcggtttg     660
actcacgggg atttccaagt ctccacccca ttgacgtcaa tgggagtttg ttttggcacc     720
aaaatcaacg ggactttcca aaatgtcgta acaactccgc cccattgacg caaatgggcg     780
gtaggcgtgt acggtgggag gtctatataa gcagagctct ctggctaact agagaaccca     840
ctgcttactg gcttatcgaa attaatacga ctcactatag ggagacccaa gcttggtacc     900
```

```
gagctcggat cgatatctgc ggcctagcta gcgcttaagg cctgttaacc ggtatggatg    960
tatgcgtccg tcttgccctg tggctcctct ggggactcct cctgcaccag gccagagcc    1020
tcagccatag tcacagtgag aaggcgacag gaaccagctc gggcgccggt ttaaacgacc    1080
ctagcaaaga ctcaaaagct caggtgtccg ctgccgaggc tggcattact ggaacatggt    1140
acaatcagct cgggagcacc tttattgtga ctgctggagc cgatggagcc ctcaccggaa    1200
catacgaatc tgctgtggga aacgccgaat cacggtacgt cctcactggc cgatacgata    1260
gtgcccctgc caccgacgga tctgggactg ccctgggatg gactgtcgct tggaaaaaca    1320
actaccggaa tgctcattct gccacaacat ggagtggaca gtacgtggga ggcgctgagg    1380
ctagaatcaa tacacagtgg ctgctcacat ctggcacaac cgaggcaaat gcttggaaat    1440
ccaccctggt gggacatgac acattcacca aagtgaaacc ctccgccgct tcaatcgatg    1500
ccgccaaaaa agccggagtc aacaacggca atcctctgga tgccgtccag cagctcggac    1560
cgaaagatga actgtgagcg gccgcataga taactgatcc agtgtgctgg aattaattcg    1620
ctgtctgcga gggccagctg ttggggtgag tactccctct caaaagcggg catgacttct    1680
gcgctaagat tgtcagtttc caaaaacgag gaggatttga tattcacctg gcccgcggtg    1740
atgcctttga gggtggccgc gtccatctgg tcagaaaaga caatctttt gttgtcaagc    1800
ttgaggtgtg gcaggcttga gatctggcca tacacttgag tgacaatgac atccactttg    1860
cctttctctc cacaggtgtc cactcccagg tccaactgca ggtcgagcat gcatctaggg    1920
cggccaattc cgcccctctc cctcccccc cctaacgtt actggccgaa gccgcttgga    1980
ataaggccgg tgtgcgtttg tctatatgtt attttccacc atattgccgt cttttggcaa    2040
tgtgagggcc cggaaacctg gccctgtctt cttgacgagc attcctaggg gtctttcccc    2100
tctcgccaaa ggaatgcaag gtctgttgaa tgtcgtgaag gaagcagttc ctctggaagc    2160
ttcttgaaga caaacaacgt ctgtagcgac cctttgcagg cagcggaacc ccccacctgg    2220
cgacaggtgc ctctgcggcc aaaagccacg tgtataagat acacctgcaa aggcggcaca    2280
accccagtgc cacgttgtga gttggatagt tgtggaaaga gtcaaatggc tctcctcaag    2340
cgtattcaac aaggggctga aggatgccca gaaggtaccc cattgtatgg gatctgatct    2400
ggggcctcgg tgcacatgct ttacatgtgt ttagtcgagg ttaaaaaaac gtctaggccc    2460
cccgaaccac ggggacgtgg ttttcctttg aaaaacacga tgataagctt gccacaaccc    2520
gggaggcgcg ccatgtacag gatgcaactc ctgtcttgca ttgcactaag tcttgcactt    2580
gtcacgaatt ccgacgagaa gaccactggt tggcgaggtg gacacgttgt tgaaggactg    2640
gctggggaac ttgaacaact tcgtgcacga ctggagcatc acccacaagg tcaacgtgaa    2700
ccacctgcag gtgtgagcaa gggcgaggag gataacatgg ccatcatcaa ggagttcatg    2760
cgcttcaagg tgcacatgga gggctccgtg aacggccacg agttcgagat cgagggcgag    2820
ggcgagggcc gccctacga gggcacccag accgccaagc tgaaggtgac caagggtggc    2880
cccctgccct cgcctgggga catcctgtcc cctcagttca gtacggctc caaggcctac    2940
gtgaagcacc ccgccgacat ccccgactac ttgaagctgt ccttccccga gggcttcaag    3000
tgggagcgcg tgatgaactt cgaggacggc ggcgtggtga ccgtgaccca ggactcctcc    3060
ctacaggacg gcgagttcat ctacaaggtg aagctgcgcg gcaccaactt cccctccgac    3120
ggccccgtaa tgcagaagaa gaccatgggc tgggaggcct cctccgagcg gatgtacccc    3180
gaggacggcg ccctgaaggg cgagatcaag cagaggctga agctgaagga cggcggccac    3240
tacgacgctg aggtcaagac cacctacaag gccaagaagc ccgtgcagct gcccggcgcc    3300
```

```
tacaacgtca acatcaagtt ggacatcacc tcccacaacg aggactacac catcgtggaa    3360
cagtacgaac gcgccgaggg ccgccactcc accggcggca tggacgagct gtacaagggc    3420
cggccactgg aaaatggcgg aacctctctg tctgaaaaaa ctgtgctgct gctggtgact    3480 cccttctgg ccgctgcttg gtccctccac ccatgaggcc tcgagggcca attaattaac    3540
tctagataac tgatcataat cagccatacc acatttgtag aggttttact tgctttaaaa    3600
aacctcccac acctccccct gaacctgaaa cataaaatga atgcaattgt tgttgttaac    3660
ttgtttattg cagcttataa tggttacaaa taaagcaata gcatcacaaa tttcacaaat    3720
aaagcatttt tttcactgca ttctagttgt ggtttgtcca aactcatcaa tgtatcttaa    3780
cgcgtcgagt gcattctagt tgtggtttgt ccaaactcat caatgtatct tatcatgtct    3840
gtataccgtc gacctctagc tagagcttgg cgtaatcatg gtcatagctg tttcctgtgt    3900
gaaattgtta tccgctcaca attccacaca acatacgagc cggaagcata agtgtaaag    3960 cctggggtgc ctaatgagtg agctaactca cattaattgc gttgcgctca ctgcccgctt    4020
tccagtcggg aaacctgtcg tgccagctgc attaatgaat cggccaacgc gcgggagag    4080 gcggtttgcg tattgggcgc tcttccgctt cctcgctcac tgactcgctg cgctcggtcg    4140
ttcggctgcg gcgagcggta tcagctcact caaaggcggt aatacggtta ccacagaat    4200 cagggggataa cgcaggaaag aacatgtgag caaaaggcca gcaaaaggcc aggaaccgta    4260
aaaaggccgc gttgctggcg ttttccata ggctccgccc cctgacgag catcacaaaa    4320 atcgacgctc aagtcagagg tggcgaaacc cgacaggact ataaagatac caggcgtttc    4380
cccctggaag ctccctcgtg cgctctcctg ttccgaccct gccgcttacc ggatacctgt    4440
ccgcctttct cccttcggga agcgtggcgc tttctcaatg ctcacgctgt aggtatctca    4500
gttcggtgta ggtcgttcgc tccaagctgg gctgtgtgca cgaaccccc gttcagcccg    4560 accgctgcgc cttatccggt aactatcgtc ttgagtccaa cccggtaaga cacgacttat    4620
cgccactggc agcagccact ggtaacagga ttagcagagc gaggtatgta ggcggtgcta    4680
cagagttctt gaagtggtgg cctaactacg gctacactag aaggacagta tttggtatct    4740
gcgctctgct gaagccagtt accttcggaa aaagagttgg tagctcttga tccggcaaac    4800
aaaccaccgc tggtagcggt ggttttttg tttgcaagca gcagattacg cgcagaaaaa    4860
aaggatctca agaagatcct ttgatctttt ctacggggtc tgacgctcag tggaacgaaa    4920
actcacgtta agggattttg gtcatgagat tatcaaaaag gatcttcacc tagatccttt    4980
taaattaaaa atgaagtttt aaatcaatct aaagtatata tgagtaaact tggtctgaca    5040
gttaccaatg cttaatcagt gaggcaccta tctcagcgat ctgtctattt cgttcatcca    5100
tagttgcctg actccccgtc gtgtagataa ctacgatacg ggagggctta ccatctggcc    5160
ccagtgctgc aatgataccg cgagacccac gctcaccggc tccagattta tcagcaataa    5220
accagccagc cggaagggcc gagcgcagaa gtggtcctgc aactttatcc gcctccatcc    5280
agtctattaa ttgttgccgg gaagctagag taagtagttc gccagttaat agtttgcgca    5340
acgttgttgc cattgctaca ggcatcgtgg tgtcacgctc gtcgtttggt atggcttcat    5400
tcagctccgg ttcccaacga tcaaggcgag ttacatgatc ccccatgttg tgcaaaaaag    5460
cggttagctc cttcggtcct ccgatcgttg tcagaagtaa gttggccgca gtgttatcac    5520
tcatggttat ggcagcactg cataattctc ttactgtcat gccatccgta agatgctttt    5580
ctgtgactgg tgagtactca accaagtcat tctgagaata gtgtatgcgg cgaccgagtt    5640
```

-continued

```
gctcttgccc ggcgtcaata cgggataata ccgcgccaca tagcagaact ttaaaagtgc    5700
tcatcattgg aaaacgttct tcggggcgaa aactctcaag gatcttaccg ctgttgagat    5760
ccagttcgat gtaacccact cgtgcaccca actgatcttc agcatctttt actttcacca    5820
gcgtttctgg gtgagcaaaa acaggaaggc aaaatgccgc aaaaaaggga ataagggcga    5880
cacggaaatg ttgaatactc atactcttcc tttttcaata ttattgaagc atttatcagg    5940
gttattgtct catgagcgga tacatatttg aatgtattta gaaaaataaa caaatagggg    6000
ttccgcgcac atttccccga aaagtgccac ctgacgtc                            6038
```